United States Patent
Kim et al.

(10) Patent No.: US 10,445,608 B2
(45) Date of Patent: Oct. 15, 2019

(54) IDENTIFYING OBJECT REPRESENTATIONS IN IMAGE DATA

(71) Applicant: MOTOROLA MOBILITY LLC, Chicago, IL (US)

(72) Inventors: Mina Kim, Chicago, IL (US); Rahul B. Desai, Hoffman Estates, IL (US); Rohan S. Prabhu, Chicago, IL (US); Kevin O. Foy, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 211 days.

(21) Appl. No.: 15/792,975

(22) Filed: Oct. 25, 2017

(65) Prior Publication Data

US 2019/0122063 A1   Apr. 25, 2019

(51) Int. Cl.
| | |
|---|---|
| G06K 9/22 | (2006.01) |
| G06K 9/24 | (2006.01) |
| G06T 7/00 | (2017.01) |
| G06K 9/82 | (2006.01) |
| G06K 9/78 | (2006.01) |
| G06T 7/73 | (2017.01) |

(52) U.S. Cl.
CPC .......... *G06K 9/24* (2013.01); *G06K 9/78* (2013.01); *G06K 9/82* (2013.01); *G06T 7/001* (2013.01); *G06T 7/73* (2017.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 7,464,090 | B2 * | 12/2008 | Betz | G06N 20/00 |
| 8,194,986 | B2 * | 6/2012 | Conwell | G06K 9/228 |
| | | | | 382/224 |
| 8,606,021 | B2 * | 12/2013 | Conwell | G06K 9/228 |
| | | | | 382/224 |
| 8,755,837 | B2 * | 6/2014 | Rhoads | G06K 9/6253 |
| | | | | 455/556.1 |
| 9,104,915 | B2 * | 8/2015 | Conwell | G06K 9/228 |
| 9,767,359 | B2 * | 9/2017 | Son | G06K 9/00624 |
| 9,830,534 | B1 * | 11/2017 | Ravichandran | G06K 9/00671 |
| 10,002,337 | B2 * | 6/2018 | Siddique | G06Q 10/0637 |
| 10,115,015 | B2 * | 10/2018 | Son | G06K 9/00624 |
| 2010/0030578 | A1 * | 2/2010 | Siddique | G06Q 10/0637 |
| | | | | 705/3 |

(Continued)

*Primary Examiner* — Feng Niu
(74) *Attorney, Agent, or Firm* — Yudell Isidore PLLC

(57) ABSTRACT

A method, a device, and a computer program product for identifying objects in image data. The device is enabled to, in response to determining that an object type of a first set of object types is represented in the image data, indicate that the object type is represented in captured image data. The device is further enabled to, in response to determining that no object type of the first set of object types is represented in the image data, determine whether the image data comprises an object characteristic of a specific one of a second set of object types. The device is further enabled to, in response to determining that the image data comprises an object characteristic of the specific one of the second set of object types, indicate that the image data comprises an object characteristic of the specific one of the second set of object types.

19 Claims, 10 Drawing Sheets

(56) References Cited

U.S. PATENT DOCUMENTS

| | | | |
|---|---|---|---|
| 2013/0215116 A1* | 8/2013 | Siddique | G06Q 30/0643 345/420 |
| 2014/0270347 A1* | 9/2014 | Xu | G06K 9/6282 382/103 |
| 2014/0376769 A1* | 12/2014 | Bulan | G06K 9/00771 382/103 |

* cited by examiner

IDENTIFYING OBJECT REPRESENTATIONS IN IMAGE DATA

BACKGROUND

1. Technical Field

The present disclosure generally relates to electronic devices having image sensors and in particular to identifying objects in image data captured by an image sensor of an electronic device.

2. Description of the Related Art

Many modern personal devices, such as cellular phones, are equipped with image sensors (as part of one or more cameras, for example) that can be used to capture images and/or video. Image processing techniques can be used to identify objects, such as barcodes, faces, and landmarks, in images captured by an image sensor. However, due to processing and storage limitations, user devices are limited in the variety of objects that may be identified and the amount of information available about the identified objects. To overcome these limitations, a personal device may offload some of the object identification operations to a search and analysis system.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
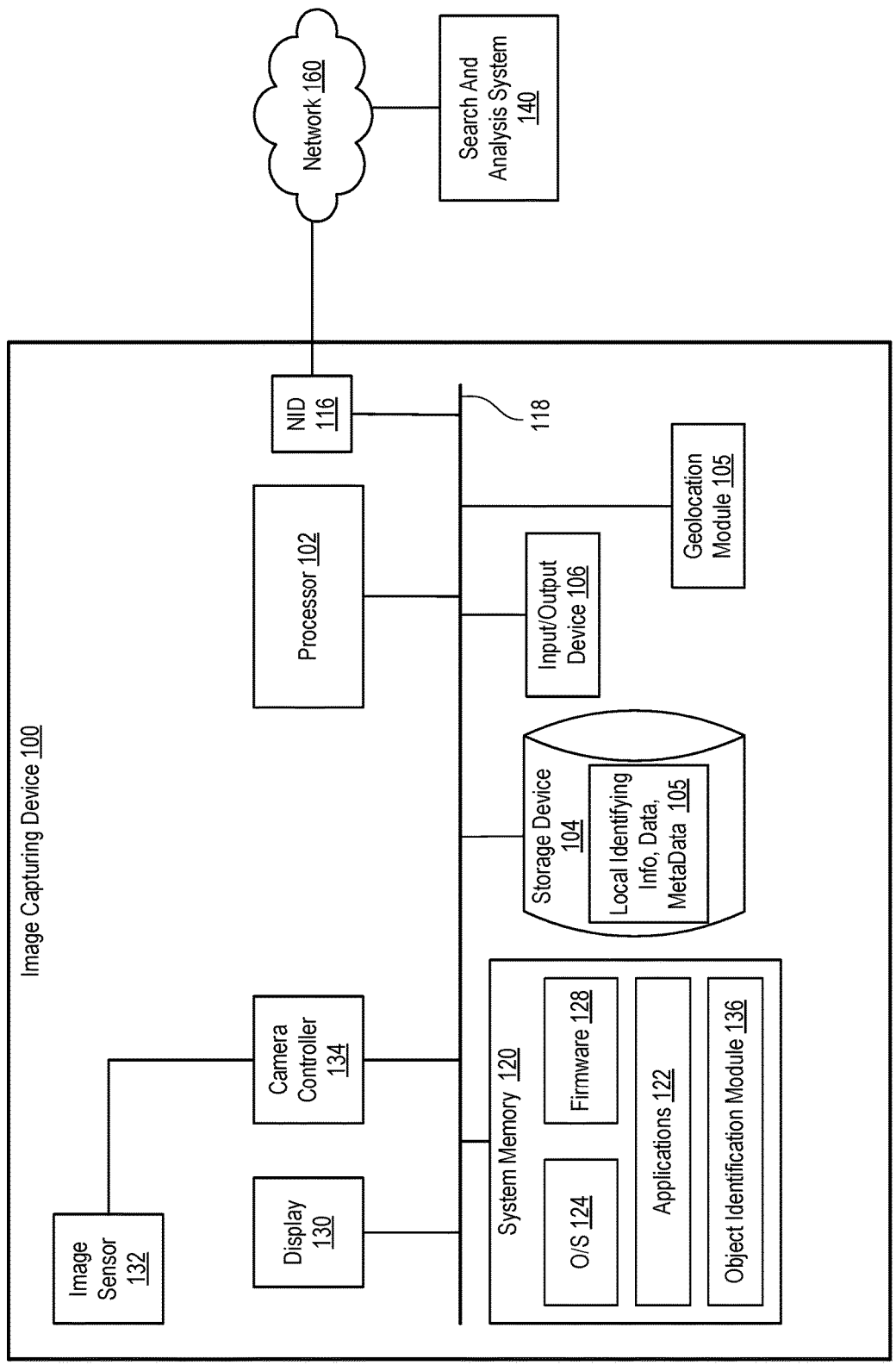
FIG. 1A depicts an example image capturing device within which various aspects of the disclosure can be implemented, according to one or more embodiments.

The illustrative embodiments provide a method, a device, and a computer program product for identifying objects in image data. The method includes capturing image data using an image sensor of a first device. The method further includes determining, by the first device, whether the image data comprises a representation of a first type of object. The method further includes, in response to determining that the image data does not comprise a representation of the first type of object, determining that the image data comprises a characteristic of a different type of object based, at least in part, on a focus distance associated with the image data. The method further includes, in response to determining that the image data comprises the characteristic of the different type of object, indicating, to a user, that the image data comprises a characteristic of the different type of object.

According to another embodiment, a device comprises an image sensor and one or more processors that execute program code. The execution of the program code enables the device to capture image data using the image sensor. The execution of the program code further enables the device to, for each of a first set of object types, determine whether a selected object type of the first set of object types is represented in the image data and, in response to a determination that the selected object type of the first set of object types is represented in the image data, indicate that the selected object type of the first set of object types is represented in the image data. The execution of the program code further enables the device to, in response to a determination that no object type of the first set of object types is represented in the image data, determine whether the image data comprises an object characteristic of a specific one of a second set of object types based, at least in part, on a first criterion and, in response to a determination that the image data comprises an object characteristic of the specific one of the second set of object types, indicate that the image data comprises an object characteristic of the specific one of the second set of object types.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1A depicts an example image capturing device 100 within which various aspects of the disclosure can be implemented, according to one or more embodiments. The image capturing device 100 can be any electronic device that can capture an image. Examples of such electronic devices include, but are not limited to, a desktop computer, a monitor, a notebook computer, a mobile phone, a digital camera, a video recorder, a tablet computer, etc. The image capturing device 100 includes a processor 102, a storage device 104 providing a local database 105 with object identifying information, data and/or metadata, an input/output device 106, a geolocation module 107, a network interface device 116, a system bus 118, system memory 120, a display 130, an image sensor 132, and a camera controller 134. The system bus 118 communicatively couples one or more of the image capturing device components to one or more other image capturing device components, such as the processor 102 and the system memory 120. In some instances, components may be communicatively coupled via a mechanism other than the system bus 118 (e.g., a direct connection), such as the image sensor 132 and the camera controller 134. Although FIG. 1A depicts particular components as being communicatively coupled via the system bus 118 or directly to each other, the particular techniques used to couple components of an image capturing device can vary between implementations.

The system memory 120 may be a combination of volatile and non-volatile memory, such as random access memory (RAM) and read-only memory (ROM). The system memory 120 can store program code or similar data associated with firmware 128, an operating system 124, applications 122, and an object identification module 136. Although depicted as being separate from the applications 122, the object identification module 136 may also be an application. The processor 102 loads and executes program code stored in the system memory 120. Examples of program code that may be loaded and executed by the processor 102 include program code associated with the object identification module 136.

As discussed above, a personal device, such as the image capturing device 100, may have limited processing and information storage capabilities, which may limit the breadth of objects that may be identified in an image as well as the amount of information that can be provided about an object. To increase the types of objects that can be identified and the amount of information about the objects that can be provided, the image capturing device 100 may work in conjunction with a device that has greater processing and information storage capabilities, such as the search and analysis system 140. The search and analysis system 140 is communicatively coupled to image capturing device 100 via one or more networks, generally represented as network 160. To enable this communication, image capture device 100 includes network interface device 116, which is a communication module.

The search and analysis system 140 may be any kind of system capable of receiving image data, identifying an object in the image data, and returning metadata associated with the identified object. Additionally, the search and analysis system 140 may be capable of receiving object data (e.g., data associated with an object identified by the image capturing device 100 itself) and returning object metadata associated with the object. Example configurations for the search and analysis system 140 include a server with a database or communicatively coupled with a database, an image analysis server and a separate search server, a cluster of search and analysis systems, a distributed computing platform, etc.

Even though utilization of the search and analysis system 140 may compensate for the limited processing and information storage capabilities of the image capturing device 100, sending data (e.g., image data, object data, etc.) to the search and analysis system 140 may take time and count against data transfer limits. Thus, various techniques can be used to maximize the limited resources available to the image capturing device 100.

According to one aspect of the disclosure, to identify objects, image capturing device 100 uses particular techniques tailored to identifying specific types of objects. For example, the image capturing device 100 may use a first technique to identify barcodes, a second technique to identify faces, as well as other techniques. To compensate for its limited processing and information storage capabilities, image capturing device 100 may utilize the techniques in an order corresponding to the amount of resources consumed by the respective techniques. For example, identifying a barcode in an image may use fewer resources than identifying a face. As such, the image capturing device 100 may analyze an image and attempt to identify a barcode first and only proceed to perform a facial recognition analysis on the image data if a barcode is not found. Similarly, because techniques that rely on the search and analysis system 140 are affected by network latency and bandwidth, techniques that can be used to identify the objects locally (i.e., without the assistance of the search and analysis system 140) may use fewer resources and thus may be used by the image capturing device 100 before using techniques that rely on the search and analysis system 140.

The delay and data usage resulting from the retrieval of object metadata and/or using the search and analysis system 140 can be reduced in at least two ways. First, the image capturing device 100 may only send a request to the search and analysis system 140 in response to an explicit request from a user or other entity. For example, the image capturing device 100 may display an icon on the display 130 and only send a request to the search and analysis system 140 when a user clicks or taps on the icon. Second, the image capturing device 100 may only allow a request to be sent to the search and analysis system 140 if certain criteria are met. For example, it may be the case that identifiable objects are typically near the image capturing device 100 (e.g., a nearby lamp) or far from the image capturing device 100 (e.g., a large building). Thus, the image capturing device 100 may only display an icon if the focus distance indicates that the image focus is on a nearby object or a faraway object and not display the icon if the focus distance indicates that the image focus is in between. Third, the image capturing device 100 may determine various characteristics that may be usable by the search and analysis system 140 to narrow down the search, thus reducing the amount of time the analysis and search takes, and increase the accuracy of the analysis and search. For example, if the focus distance indicates that the image focus is on a faraway object, the image capturing device 100 may send a request for further analysis to the search and analysis system 140 and indicate that the search and analysis should focus on landmarks.

The use of the search and analysis system 140 is not limited to identifying objects that cannot be identified by the image capturing device 100. Instead, the image capturing device 100 can also use the search and analysis system 140 to retrieve additional information about an object that the image capturing device 100 has identified. For example, the image capturing device 100 may identify a barcode in an image, extract the data represented by the barcode (e.g., a sequence of numbers representing a universal product code), and send a request for information related to the barcode data. The same or similar techniques can be used to reduce the impact of requesting object metadata from the search and analysis system 140 whether the request is to identify an object and return the object metadata or merely to return the object metadata.

In operation, the image sensor 132 is activated by a user, application, or other mechanism. In response to determining that one or more criteria are met, the image sensor 132 captures image data and sends the image data to the processor 102 via the camera controller 134. The image data may then be sent to the display 130 and/or stored (e.g., to system memory 120 and/or storage device 104).

In response to capturing the image data, the processor 102 loads the object identification module 136 from the system memory 120 and executes the program code associated with the object identification module 136. The object identification module 136 analyzes the image data and attempts to identify objects represented in the image data and/or characteristics of particular objects.

To identify the objects, the object identification module 136 implements one or more object identification techniques (hereinafter "OITs"). Each OIT specifies a set of one or more operations that allows the object identification module 136 to identify object characteristics, objects, and/or object attributes. In particular, an OIT may specify one or more operations for identifying characteristics of a particular type of object. For example, an OIT may specify operations that allow the object identification module 136 to identify the visual patterns that are characteristics of a barcode. An OIT may also specify one or more operations for identifying the objects themselves. For example, an OIT may specify that if a certain number of characteristics are identified or a confidence level is greater than a particular threshold, an actual object has been identified. An OIT may also specify operations to allow the object identification module 136 to identify specific attributes of the identified object. For example, if the object identification module 136 identifies a barcode, the OIT may also specify operations for extracting the data represented by the barcode (e.g., a sequence of numbers, data encoded into a matrix barcode, etc.).

OITs that merely allow the object identification module 136 to identify object characteristics and not objects themselves may work in conjunction with the search and analysis system 140 to identify the actual objects. The OITs that work in conjunction with the search and analysis system 140 to identify the actual objects are referred to hereinafter as "remote OITs" and the corresponding objects are referred to hereinafter as "remotely identifiable objects." Similarly, OITs that allow the object identification module 136 to identify objects themselves are referred to hereinafter as "local OITs" and the corresponding objects as "locally identifiable objects." Thus, the terms remotely and locally relate to location at which object identification occurs, relative to the image processing device 100. Data and/or metadata associated with locally identified objects can be retrieved from local database 105, in one embodiment.

After identifying object characteristics, objects, and/or object attributes, the object identification module 136 can send a request to the search and analysis system 140 to perform additional operations, as appropriate. For example, if the object identification module 136 merely identified object characteristics, the object identification module 136 may send a request to the search and analysis system 140 to identify the object and/or object attributes. The search and analysis system 140 may also identify object metadata associated with an identified object and object attributes (if any). For example, if the object identification module 136 identifies a barcode and extracts a universal product code (UPC) from the barcode, the object identification module

136 may include the UPC in a request sent to the search and analysis system 140. The search and analysis system 140 may then identify and return metadata associated with the barcode based, at least in part, on the UPC. For example, object metadata associated with a particular barcode/UPC may include a manufacturer, model number, price, and Internet search results.

Because requests to the search and analysis system 140 utilize network resources, which may result in delayed and unpredictable responses, as well as using bandwidth and potentially counting against data transfer limits, the image capturing device 100 may limit requests to the search and analysis system 140. For example, instead of automatically sending a request to the search and analysis system 140, the image capturing device 100 may solicit user feedback by displaying a notification alerting the user to the opportunity to identify an object or retrieve object metadata, and image capturing device 100 may only send the request if the user affirmatively indicates that the request should be performed. The image capturing device 100 may implement both automated requests to the search and analysis system 140 and non-automatic requests. For example, in some instances, users may want to retrieve object metadata for a particular type of object a high percentage of the time. Instead of forcing the user to affirmatively respond each time, the image capturing device 100 may send a request for the object metadata automatically. For other types of objects that are less frequently identified by users, the image capturing device 100 may request affirmative confirmation before sending the request.

The example implementations described herein may use the terms "article" and "landmark" as examples of different types of objects. Examples of articles include a lamp, a shelf, a table, a television, a computing device, a car, etc. Examples of landmarks include a building, a statue, a landscape (e.g., the Grand Canyon), etc. The definition between the two may vary between implementations. For example, some implementations may consider a statue to be an article. However, in the examples described herein, an article differs from a landmark based, at least in part, on the criteria used by the corresponding OITs. For example, some of the examples below distinguish an article from a landmark based, at least in part, on the distance from the image sensor 132 to the object.

Figure 1B:
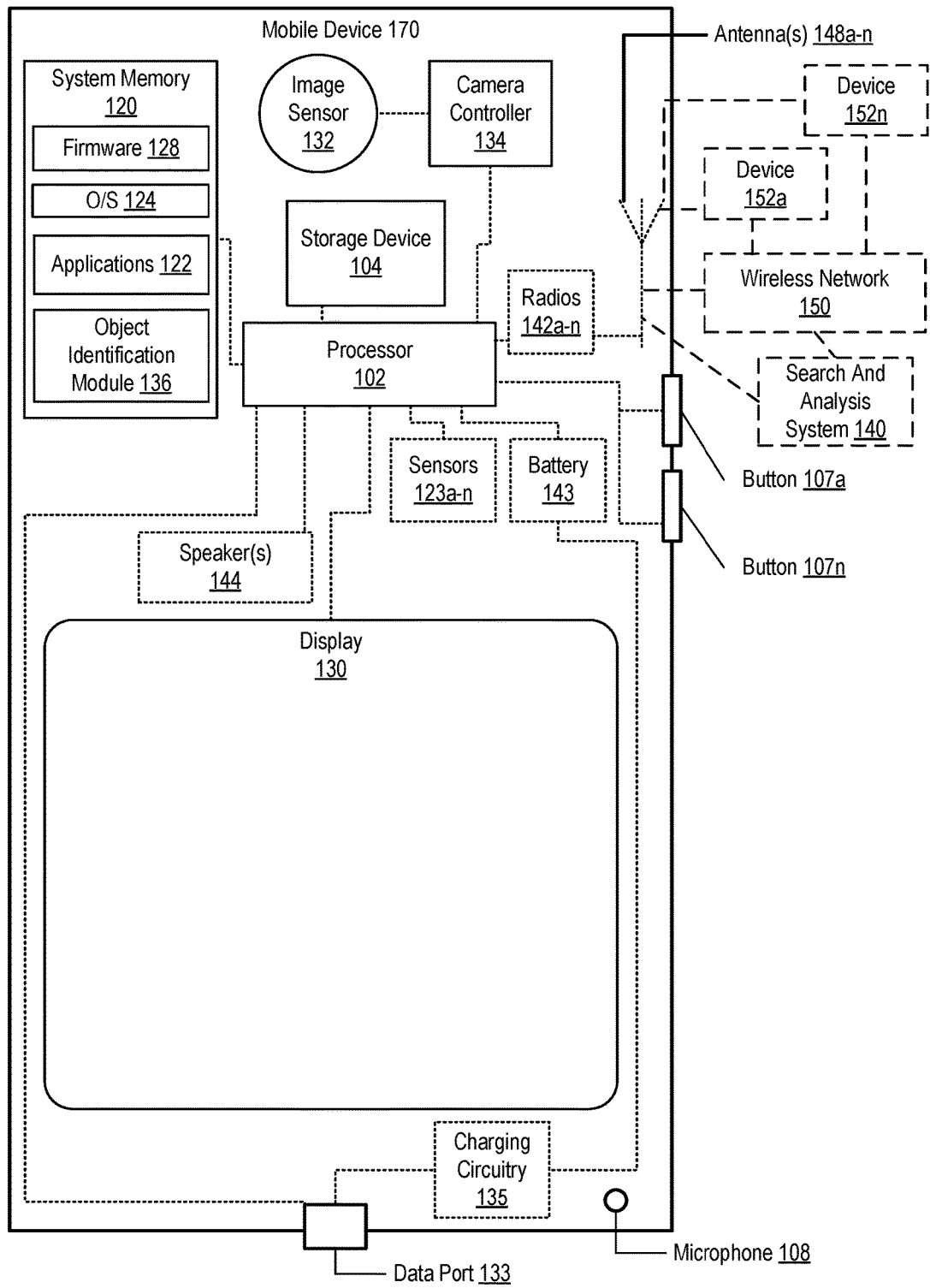
FIG. 1B depicts an example mobile device configured to be an image capturing device, according to one or more embodiments.

FIG. 1B depicts an example mobile device configured to be an image capturing device, according to one or more embodiments. Mobile device 170 includes processor 102, storage device 104, system memory 120, display 130, image sensor 132, and camera controller 134. In addition to comprising some of the same or similar components as the example image capturing device 100, mobile device 170 includes a data port 133 coupled with the processor 102, charging circuitry 135, and a battery 143. Mobile device 170 further includes a microphone 108, one or more speakers 144, one or more buttons 107*a-n*, and sensors 123*a-n*. Buttons 107*a-n* may include volume buttons, a power button, a camera shutter button, etc. Mobile device 170 further includes radios 142*a-n*, which are coupled with antennas 148*a-n*. The radios 142*a-n* and the antennas 148*a-n* provide similar functionality to that of the network interface device 116 and, in combination or individually, may be considered a network interface device. In this example, the radios 142*a-n* and the antennas 148*a-n* allow mobile device 170 to communicate wirelessly with devices 152*a-n* and the search and analysis system 140 either directly or via a wireless network 150.

In operation, mobile device 170 operates similarly to image capturing device 100. In particular, mobile device 170 captures image data and image metadata via the image sensor 132 and the camera controller 134. The processor 102 loads and executes the object identification module 136, which analyzes the image data and image metadata in accordance with a set of object identification techniques. The operations performed by the object identification module 136 in response to identifying an object characteristic or object may vary. For example, the object identification module 136 may send a search and analysis request to the search and analysis system 140 or may indicate that an object characteristic or object was identified. In some implementations, the object identification module 136 may use the identification of an object characteristic or object to determine when to stop performing operations. The object identification module 136 may receive an indication that a search and analysis request should be sent to the search and analysis system 140 and, in response, send a search and analysis request to the search and analysis system 140. The object identification module 136 may also receive object metadata from the search and analysis system 140 and may parse and format the object metadata to present as additional information about or associated with the object. After parsing and formatting the object metadata, the object identification module 136 may cause the object metadata to be displayed on the display 130.

Figure 2:
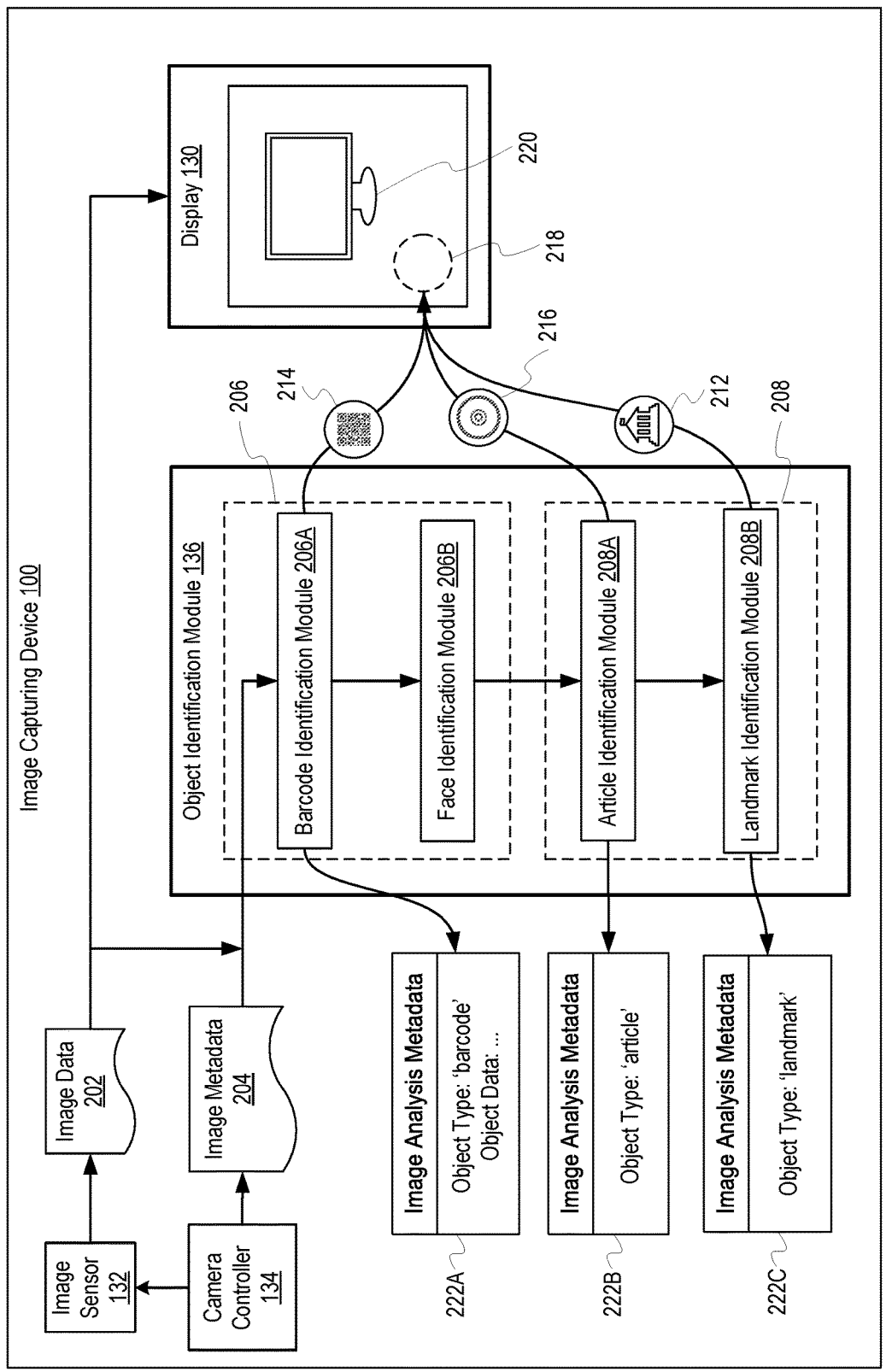
FIG. 2 is a block diagram illustrating the identification of object characteristics, objects, and/or object attributes in image data, according to one or more embodiments.

FIG. 2 is a block diagram illustrating the identification of object characteristics, objects, and/or object attributes in image data, according to one or more embodiments. FIG. 2 depicts the image capturing device 100, which includes image sensor 132, camera controller 134, object identification module 136, and display 130. Object identification module 136 includes a set of local OITs 206 and a set of remote OITs 208. Each OIT is implemented as a module, which may be an independent set of program code usable by the object identification module 136. In this example, FIG. 2 depicts a barcode identification module 206A and a face identification module 206B as example local OITs and an article identification module 208A and a landmark identification module 208B as example remote OITs. The display 130 includes a location 218 for displaying an icon, as described in more detail below. By default, no icon is displayed at location 218.

In operation, the image sensor 132 is activated by a user, an application running on the image capturing device 100, or other mechanism. After activation, camera controller 134 determines that image data 202 should be captured based, at least in part, on one or more criteria. The specific criteria can vary between implementations. Example criteria may be a focus distance remaining in a particular range for a particular length of time or the reception of a triggering event, such as a user tapping a shutter button (e.g., one of buttons 107*a-n*).

In response to determining that the image data 202 should be captured based, at least in part, on the one or more criteria, camera controller 134 directs image sensor 132 to capture image data 202. After the image data 202 is captured, the image data 202 is sent to the display 130 and the object identification module 136. The image data 202 may be sent to the display 130 and object identification module 136 via one or more other components, such as the camera controller 134 or the processor 102. For example, once the image sensor 132 captures the image data 202, the image sensor 132 may send the image data 202 to the camera controller 134, which may then send the image data 202 to the processor 102. The image data 202 can be dynamic image data streamed from the image sensor 132 to the display 130 and the object identification module 136 (e.g., a live preview and/or video) or static image data captured at a particular point in time (e.g., a photo). When the display 130 receives the image data 202, the display 130 renders a visual representation of the image data 202. In this example, the image data 202 depicts a monitor 220.

Further, in response to determining that the image data 202 should be captured, the camera controller 134 sends image metadata 204 to the object identification module 136. The image metadata 204 may include various metadata associated with the image data 202, such as the focus distance setting used by the image sensor 132, whether the flash was used, light intensity, etc. In some implementations (e.g., when the image data 202 is sent to the object identification module 136 via the camera controller 134), the image data 202 and image metadata 204 may be combined.

When the object identification module 136 receives the image data 202 and the image metadata 204, the object identification module 136 uses the OITs to identify object characteristics, objects, object attributes, or a combination thereof. The specific operations performed may vary between implementations and are dependent on the OIT. For example, some OITs may specify visual patterns that are representative of a particular type of object (e.g., barcode, face, business card, etc.) and some OITs may specify characteristics of a particular type of object (e.g., focus distance setting, camera mode, camera orientation, etc.).

In response to identifying one or more object characteristics, an object, and/or object attributes, the object identification module 136 may perform one or more operations that may vary between implementations and between OITs. For example, the object identification module 136 may send a request to the search and analysis system 140 for object identification and/or object metadata retrieval or may notify the user that one or more object characteristics, an object, and/or object attributes have been identified. In some cases, the object identification module 136 may utilize the identification of an object or object characteristic to determine when to stop performing operations. For example, the object identification module 136 may be implemented such that no object metadata is retrieved if the object identification module 136 identifies a face.

The request sent to the search and analysis system 140 may include various data depending on the specific identifications made by the object identification module 136. For example, if the object identification module 136 identified object characteristics (e.g., an object type, object geocoordinates, etc.), regardless of whether an actual object was identified, the request may include the object characteristics. If the object identification module 136 identified an object and/or object attributes, the request may also comprise data representing the object and/or the object attributes. For example, object attributes of a barcode may be the data represented by the barcode and object attributes of a business card may be the textual information on the business card.

In the example depicted in FIG. 2, the object identification module 136 uses the barcode identification module 206A to determine whether a barcode is represented in the image data 202. The barcode identification module 206A may identify a barcode by identifying various characteristics associated with barcodes, such as predetermined visual patterns. For example, the visual patterns may be a linear set of alternating light and dark lines, a set of squares arranged into a particular orientation (e.g., a QR code pattern), etc. In response to determining that the image data 202 includes a representation of a barcode, the barcode identification module 206A indicates, in the image analysis metadata 222 (as illustrated by image analysis metadata 222A), that the object type identified in the image data 202 is a barcode. Further in response to determining that a barcode is represented in the image data 202, the barcode identification module 206A causes a barcode icon 214 to be displayed on the display 130 (e.g. at location 218). After the barcode identification module 206A determines that a barcode is represented in the image data 202, the object identification module 136 stops analysis of the image data 202.

If the barcode identification module 206A does not identify a representation of a barcode in the image data 202, the object identification module 136 uses the face identification module 206B to determine whether a face is represented in the image data 202. The face identification module 206B may identify a face by identifying various characteristics associated with faces, such as predetermined visual patterns common to eyes, noses, and mouths. In response to determining that the image data 202 includes a representation of a face, the object identification module 136 stops analysis of the image data 202.

If the face identification module 206B does not identify a representation of a face in the image data 202, the object identification module 136 uses the article identification module 208A to determine whether an article may be represented in the image data 202. The article identification module 208A implements a remote OIT, and the article identification module 208A uses one or more criteria to identify characteristics that may be indicative of an article. For example, a focus distance indicating that a camera associated with the image sensor 132 was focused on an object nearby (e.g., within one meter) may be indicative that the image data 202 includes a representation of an article. As another example, it may be the case that, in typical usage, a user takes a picture of an article while looking down at the article. Thus, if the image capturing device 100 (and thereby the image sensor 132) is oriented such that the image sensor 132 is facing at a downward angle, the article identification module 208A may determine that the image data 202 includes a characteristic of an article. Data such as the focus distance and camera orientation may be included in the image metadata 204. In response to determining that the image data 202 may include a representation of an article, the article identification module 208A indicates, in the image analysis metadata 222 (as illustrated by image analysis metadata 222B), that the image data 202 may include a representation of an article. Further in response to determining that an article may be represented in the image data 202, the article identification module 208A causes an article icon 216 to be displayed on the display 130 (e.g. at location 218).

If the article identification module 208A does not determine that the image data 202 may include a representation of an article, the object identification module 136 uses the landmark identification module 208B to determine whether a landmark may be represented in the image data 202. The landmark identification module 208B implements a remote OIT, and the landmark identification module 208B uses one or more criteria to identify characteristics of a landmark. For example, a focus distance indicating that a camera associated with the image sensor 132 was focused on an object in the distance (e.g., a maximum focus distance associated with the camera) may be indicative that the image data 202 includes a representation of a landmark. As another example, if a camera associated with the image sensor 132 is in panoramic mode, the image data 202 may include a representation of a landmark. Further in response to determining that a landmark may be represented in the image data 202, the landmark identification module 208B causes a landmark icon 212 to be displayed on the display 130 (e.g., at location 218).

If the object identification module 136 uses all the OITs to analyze the image data 202 and does not determine that the image data 202 contains or may contain an object, the object identification module 136 halts the analysis of the image data 202 without displaying an icon on the display 130.

The example image analysis metadata 222 only depicts a subset of the data that might be included, which may include any data usable by the search and analysis system 140. For example, in addition to object characteristics (e.g., object type, as illustrated in FIG. 2) and object data, the image analysis metadata 222 may also include object attributes.

The specific order in which the object identification module 136 uses the OITs to analyze the image data is an example and not a limitation. The specific OITs used by the object identification module 136 may exclude one or more of the OITs described in the examples as well as include one or more OITs not described in the examples.

Figure 3:
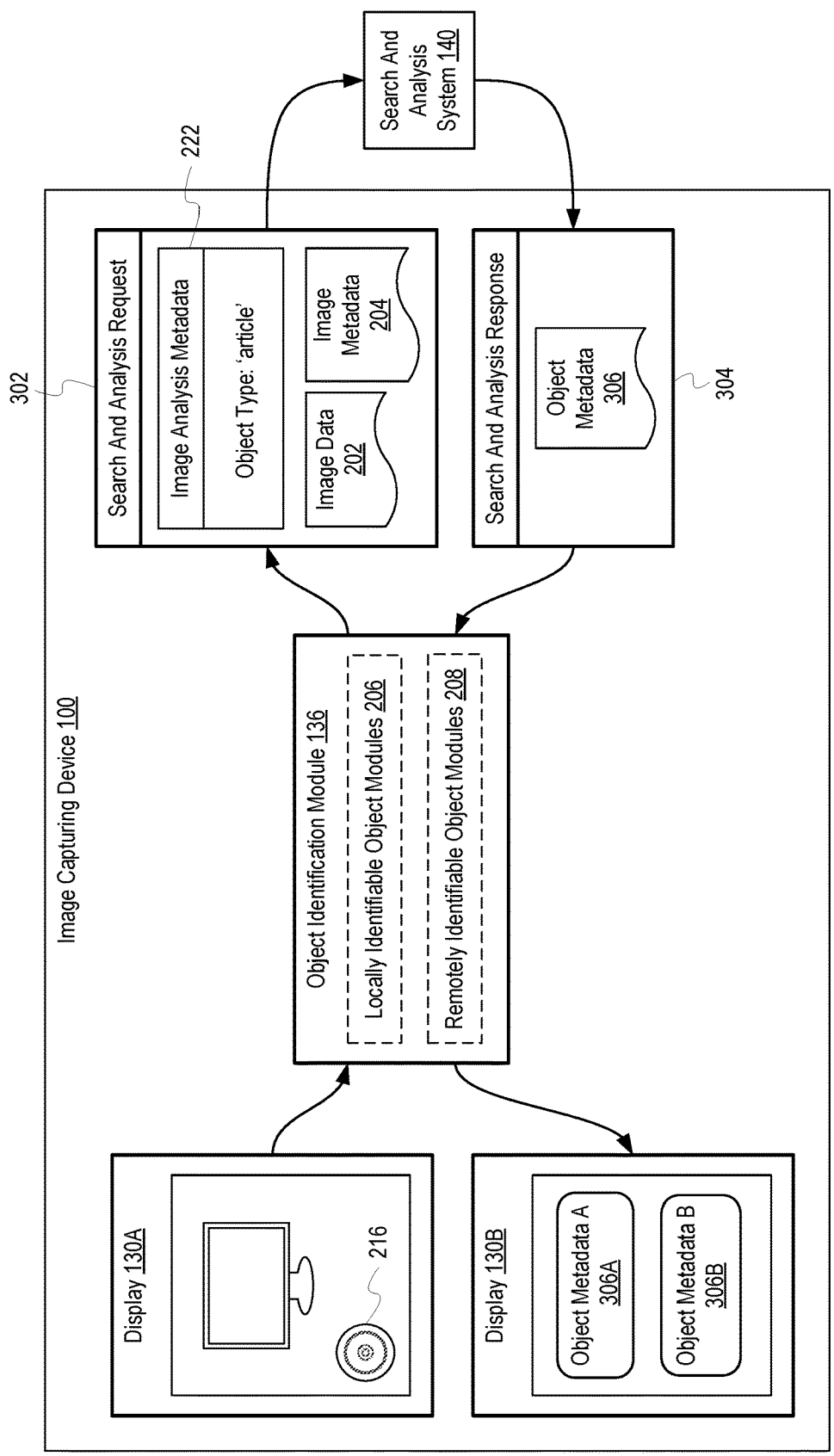
FIG. 3 is a block diagram illustrating the use of a search and analysis system to identify an object in image data and/or retrieve object metadata associated with an identified object, according to one or more embodiments.

FIG. 3 is a block diagram illustrating the use of a search and analysis system to identify an object in image data and/or retrieve object metadata associated with an identified object, according to one or more embodiments. FIG. 3 depicts image capturing device 100, including object identification module 136 and two states of display 130, display state 130A and display state 130B. FIG. 3 also depicts the search and analysis system 140, a search and analysis request 302, and a search and analysis response 304.

The operations depicted in FIG. 3 occur after the object identification module 136 completes the analysis of the image data 202 and displays an icon corresponding to the particular OIT, as described in the description of FIG. 2. In the specific example depicted in FIG. 3, the object identification module 136 has determined that the image data 202 may include a representation of an article and has displayed the article icon 216, as depicted in display state 130A.

In this example, the article icon 216 is an icon that has one or more triggering events associated with it and is hereinafter referred to as an "actionable icon". When a triggering event associated with an actionable icon occurs, such as a user tapping on the icon, one or more components of the image capturing device 100 receives an indication of the triggering event. In this example, the object identification module 136 receives the indication that a triggering event associated with the article icon 216 has occurred.

After receiving the indication that the triggering event associated with the article icon 216 has occurred, the object identification module 136 generates the search and analysis request 302. The particular data included with the search and analysis request 302 can vary. For example, if the search and analysis request 302 includes a request to identify a representation of an object in the image data 202, the search and analysis request 302 may include the image data 202, the image metadata 204, and the image analysis metadata 222. If the search and analysis request 302 is a request for object metadata and not object identification, the search and analysis request 302 may exclude the image data 202 and the image metadata 204, but may include the image analysis metadata 222.

After generating the search and analysis request 302, the object identification module 136 sends the search and analysis request 302 to the search and analysis system 140.

In response to receiving the search and analysis request 302, the search and analysis system 140 performs one or more operations based, at least in part, on the information/data presented with the search and analysis request 302. If the search and analysis request 302 requests that an object be identified, the search and analysis system 140 attempts to identify an object represented in the image data 202. After identifying an object, the search and analysis system 140 identifies object metadata 306 associated with the identified object (identified in the image analysis metadata 222 or identified by the search and analysis system 140). The object metadata 306 can vary between implementations and objects, but can include search results associated with the identified object.

The operations performed by the search and analysis system 140 can vary based, at least in part, on the content of the search and analysis request 302. For example, if the image analysis metadata 222 includes object characteristics, the search and analysis system 140 may restrict the search and analysis to objects that include the specified object characteristics. As another example, if the image analysis metadata 222 identifies the object type as an "article," the search and analysis system 140 might only analyze the image data 202 for objects in the "article" category. As yet another example, if the image analysis metadata 222 includes object attributes, such as the contact information on a business card, the search and analysis system 140 may include the object attributes when identifying the object metadata 306.

After performing the one or more operations, the search and analysis system 140 generates the search and analysis response 304. The search and analysis response 304 includes at least the object metadata 306, which comprises metadata associated with the identified object, whether identified in the image analysis metadata 222 or identified by the search and analysis system 140 itself. The object metadata 306 may include a name of an identified object, geocoordinates associated with the object, search results associated with the object, etc.

After generating the search and analysis response 304, the search and analysis system 140 sends (communicates) the search and analysis response 304, and the response is ultimately presented to and/or received by the object identification module 136.

After receiving the search and analysis response 304 from the search and analysis system 140, the object identification module 136 extracts the object metadata 306 from the search and analysis response 304. The object identification module 136 then parses and/or analyzes the object metadata 306 and formats the object metadata 306 for display. After formatting the object metadata 306 for display, the object identification module 136 sends the formatted object metadata 306 to be displayed, as depicted in display state 130B. In particular, the object metadata 306 has been formatted into two different groups of object metadata, object metadata A 306A and object metadata B 306B. The particular format in which the object metadata 306 is displayed can vary between implementations.

The example depicted in FIG. 3 describes the operations performed to identify a remotely identifiable object. If the object is locally identifiable, as presented in the description of FIG. 2, the search and analysis request 302 can vary accordingly. For example, if the object identification module 136 identified the object, the search and analysis request 302 may include identification information associated with the particular object. Further, in some implementations, the object identification module 136 may halt operations or otherwise not send the search and analysis request 302 depending on the particular OIT used.

Figure 4:
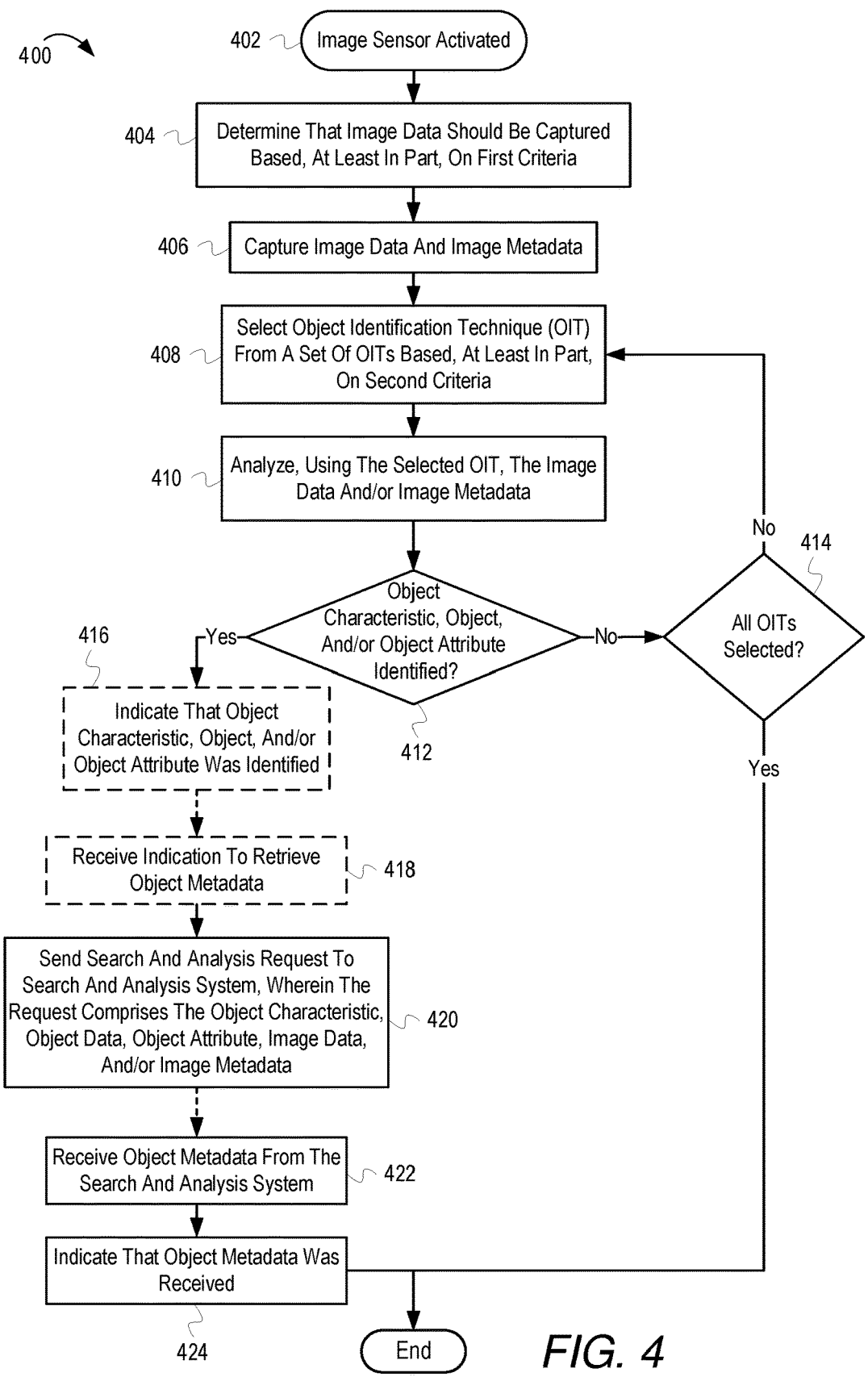
FIG. 4 depicts a method of retrieving object metadata based, at least in part, on the identification of an object characteristic, object, and/or object attribute associated with image data, according to one or more embodiments.

FIG. 4 depicts a method 400 of retrieving object metadata based, at least in part, on the identification of an object characteristic, object, and/or object attribute associated with image data 202, according to one or more embodiments. The operations depicted in FIG. 4 can be performed by image capturing device 100 or any suitable device, including one or more components of image capturing device 100. For example, one or more of the processes of the method described in FIG. 4 may be performed by a processor (e.g., processor 102) executing program code associated with the object identification module 136 within an image capturing device (e.g., image capturing device 100).

Method 400 begins at block 402 when the image sensor 132 is activated. The image sensor 132 can be activated by a user of the image capturing device 100, software executing on the image capturing device 100, etc. After the image sensor 132 is activated, the method 400 proceeds to block 404.

At block 404, the image capturing device 100 determines that the image data 202 should be captured based, at least in part, on first criteria. The criteria may vary between implementations. For example, the criteria may include receiving an indication of a triggering event (e.g., a user pressing a shutter button), determining that a focus distance of a camera associated with the image sensor 132 has remained within a particular range for a predetermined period of time, or determining that the image sensor 132 has been oriented in the same general direction for a predetermined period of time. The determination that the image data 202 should be captured may also be based, at least in part, on the image metadata 204. For example, the image metadata 204 may include the focus distance and/or other metadata usable as criteria for determining that the image data 202 should be captured. After the image capturing device 100 determines that the image data 202 should be captured, the method 400 proceeds to block 406.

At block 406, the image capturing device 100 captures the image data 202 and the image metadata 204. The image metadata 204 may include various data associated with the image sensor 132 and associated components (such as a camera associated with the image sensor 132), including a focus distance, shutter speed, whether a flash was used, light intensity, etc. After the image data 202 and image metadata 204 is captured, the method 400 proceeds to block 408.

At block 408, the image capturing device 100 selects an OIT from a set of OITs based, at least in part, on second criteria. The criteria used by the image capturing device 100 to select the OIT can vary. For example, in some implementations, the image capturing device 100 may select the OIT based, at least in part, on the amount of resources used by the OIT or an expected length of time for completion of analysis performed in accordance with the OIT. For example, because a local OIT does not use network resources to identify an object, a local OIT may be selected before a remote OIT. As another example, the OIT may be selected based, at least in part, on a camera mode. For example, if a camera associated with the image sensor 132 is set to a panoramic mode, the image capturing device 100 may select a landmark OIT instead of OITs related to barcodes, articles, etc. In some implementations, the order in which the image capturing device 100 selects OITs may be predetermined. For example, the second criteria may be used to predetermine the order once instead of dynamically determining the order each time the method 400 is performed. As presented in the description of FIGS. 2 and 3, the OIT can be implemented as modules executable by the processor 102 or another component. After the image capturing device 100 selects the OIT from the set of OITs, the method 400 proceeds to block 410.

At block 410, the image capturing device 100 analyzes, using the selected OIT, the image data 202 and/or the image metadata 204. Some OITs may be applied to the image data 202, the image metadata 204, or both. For example, an OIT used to identify faces may analyze the image data 202 for visual patterns associated with facial features. An OIT used to identify landmarks, however, may analyze the image metadata 204 to determine whether a landmark may be represented in the image data 202. After the image capturing device 100 analyzes, using the selected OIT, the image data 202 and/or the image metadata 204, the method 400 proceeds to block 412.

At block 412, the image capturing device 100 determines whether an object characteristic, object, and/or object attribute was identified by the selected OIT. The image capturing device 100 may determine whether an object characteristic, object, and/or object attribute was identified in the image data 202 based, at least in part, on the results of the analysis performed at block 410. The object characteristics, objects, and object attributes that may be identified can vary between implementations and between OITs. If no object characteristic, object, or object attribute was identified by the OIT, the method 400 proceeds to block 414. If an object characteristic, object, or object attribute was identified by the OIT, the method 400 proceeds to block 416 or block 420, as described below.

At block 414, the image capturing device 100 determines whether all OITs were selected. If all OITs were selected, the method 400 ends. If one or more OITs were not selected, the method 400 returns to block 408.

Blocks 416 and 418 describe operations in which the image capturing device 100 indicates that an object characteristic, object, or object attribute was identified and then receives an indication that object metadata should be retrieved. As indicated by the dashed outlines, these operations are optional and may be performed for some OITs and not performed for other OITs. In an implementation in which these operations are not performed, the method 400 proceeds from block 412 straight to block 420. If no indication that object metadata should be retrieved is received, the method 400 ends.

If the image capturing device 100 identified an object characteristic, object, or object attribute at block 412, the method 400 proceeded to block 416. At block 416, the image capturing device 100 indicates that the object characteristic, object, or object attribute was identified. The particular indication can vary between implementations. For example, in some implementations, the indication may be directed to a user of the image capturing device 100. Examples of an indication directed to a user may be a notification, such as the display of an icon, a button indicator, a vibration, a sound, etc. In some instances, the indication may be directed to another process, application, or other entity. For example, if an application executing on the image capturing device 100 triggered the activation of the image sensor 132 at block 402, the indication that an object characteristic, object, or object attribute was identified may be sent to the application. The indication that an object characteristic, object, or object attribute was identified may reflect the object characteristic, object, or object attribute. For example, if the object identified is a barcode, the indication may be the barcode icon 214. After the image capturing device 100 indicates that the object characteristic, object, or object attribute was identified, the method 400 proceeds to block 418.

At block 418, the image capturing device 100 receives an indication that object metadata should be retrieved. The specific indication received can vary between implementations. For example, the indication that the object metadata 306 should be retrieved may be receipt of a signal indicating that a user pressed a button, tapped on a specific location on a touchscreen, selected the icon, spoke a specific command, etc. As another example, the indication that the object metadata 306 should be retrieved may come from an application.

In some embodiments, the indication that the object metadata 306 should be retrieved may be received asynchronously, as indicated by the dashed arrow between blocks 416 and 418. For example, the object identification module 136 may indicate that a particular function (e.g., a callback function) should be called when the image capturing device 100 receives the indication. In some embodiments, the image capturing device 100 may explicitly determine that the indication has been received by, for example, polling another component or checking the value of a particular variable. After the image capturing device 100 receives an indication that the object metadata 306 should be retrieved, the method 400 proceeds to block 420.

At block 420, the image capturing device 100 forwards the search and analysis request 302 to the search and analysis system 140. The request for the object metadata 306 may comprise the object characteristic, object, and/or object attribute identified at block 410, the image data 202, the image metadata 204, and/or any additional data usable by the search and analysis system 140. After the image capturing device 100 forwards the request for the object metadata 306 to the search and analysis system 140, the method 400 proceeds to block 422.

At block 422, the image capturing device 100 receives the object metadata 306 from the search and analysis system 140. The object metadata 306 can include any data associated with the identified object (whether identified by the image capturing device 100 at block 410 or identified by the search and analysis system 140). For example, the object metadata 306 can include information describing the object itself, such as the object's name, description, location, brand, price, web search results, etc.

In some embodiments, the object metadata 306 may be received asynchronously, as indicated by the dashed arrow between blocks 420 and 422. For example, the object identification module 136 may indicate that a particular function (e.g., a callback function) should be called when the image capturing device 100 receives the object metadata 306. In some embodiments, the image capturing device 100 may explicitly determine that the object metadata 306 has been received by, for example, polling another component or checking the value of a particular variable. After the image capturing device 100 receives the object metadata 306, the method 400 proceeds to block 424.

At block 424, the image capturing device 100 indicates that the object metadata 306 was received. The particular indication may vary between implementations. For example, in some implementations the image capturing device 100 may display some or all of the object metadata 306 on the display 130 or may otherwise provide a visual, auditory, or tactile indication to the user. In some implementations, the image capturing device 100 may send the object metadata 306 to a particular component or software application executing on the image capturing device 100. After the image capturing device 100 indicates that the object metadata 306 was received, the method 400 ends.

Figure 5A:
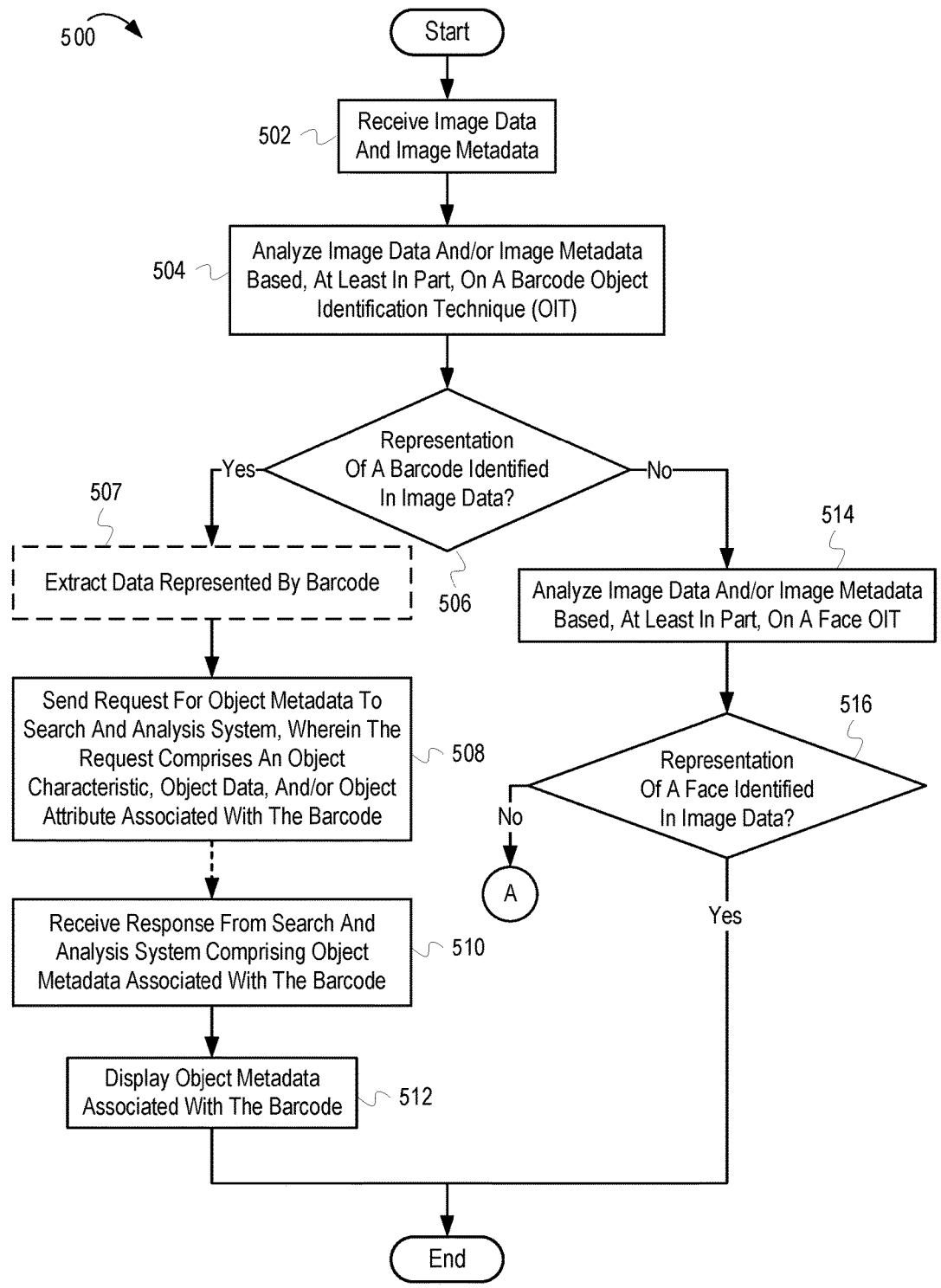
FIGS. 5A-5C depict a method of analyzing image data using a set of object identification techniques, according to one or more embodiments.
Figure 5B:
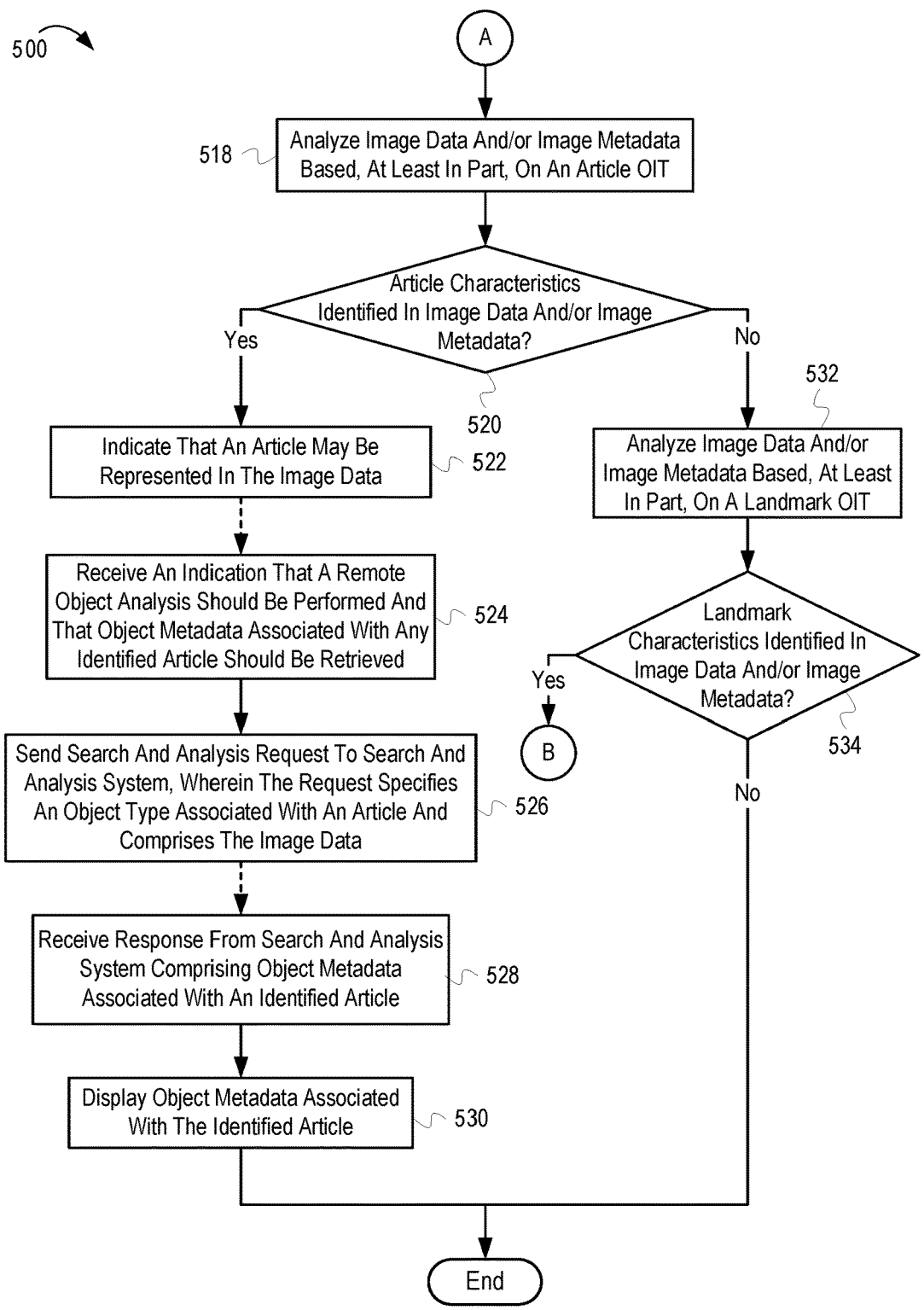
Figure 5C:
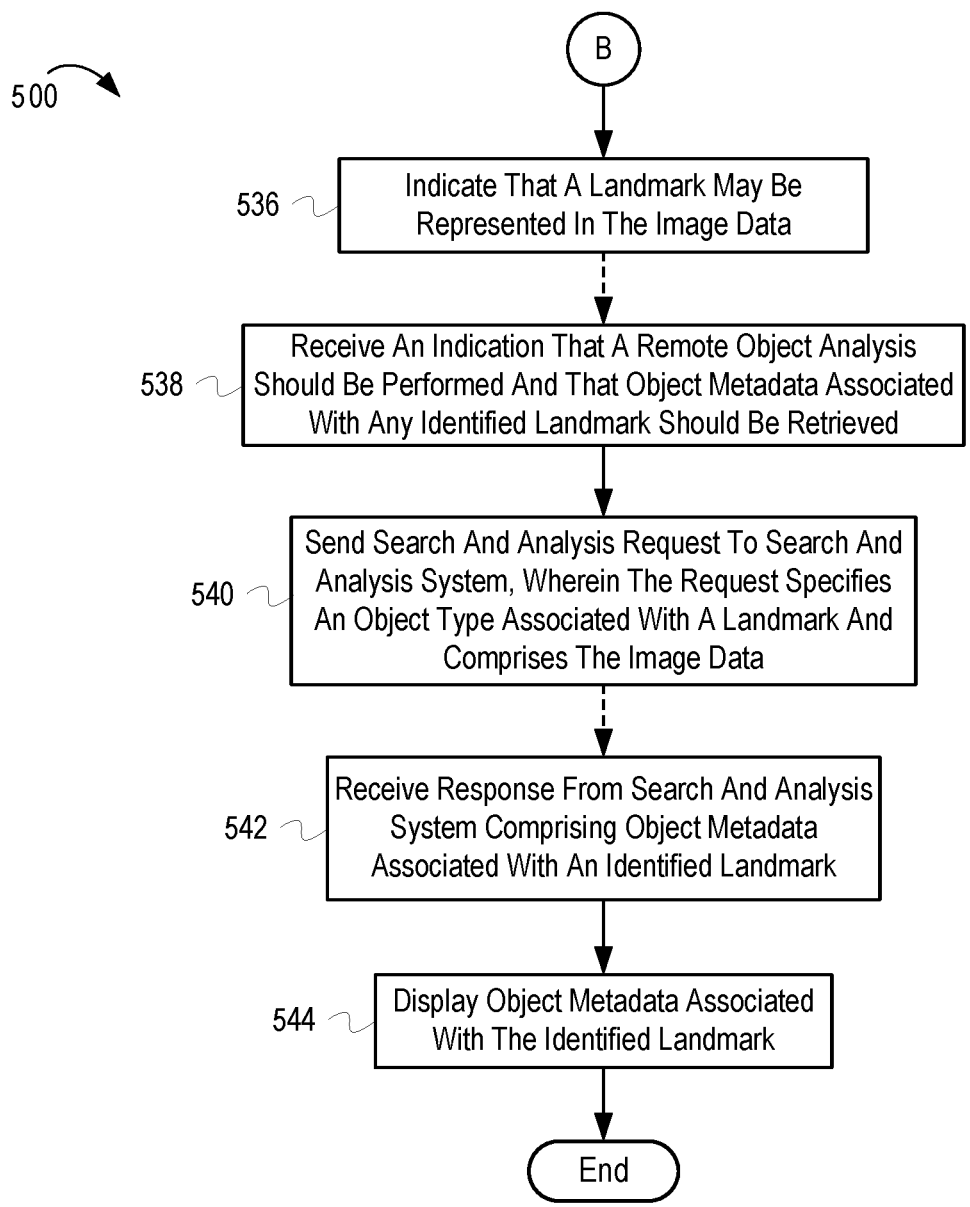

FIGS. 5A, 5B, and 5C depict a method 500 of analyzing image data using a set of OITs, according to one or more embodiments. The operations depicted in FIGS. 5A, 5B, and 5C can be performed by image capturing device 100 or any suitable device, including one or more components of image capturing device 100. For example, one or more of the processes of the method described in FIGS. 5A, 5B, and 5C may be performed by a processor (e.g., processor 102) executing program code associated with the object identification module 136 within an image capturing device (e.g., image capturing device 100). The method 500 describes the use of specific examples of OITs, but various other OITs can be used.

The method 500 begins at block 502 of FIG. 5A. At block 502, the image capturing device 100 captures the image data 202 and the image metadata 204. After the image capturing device 100 receives the image data 202 and the image metadata 204, the method 500 proceeds to block 504.

At block 504, the image capturing device 100 analyzes the image data 202 and/or the image metadata 204 based, at least in part, on a barcode OIT. For example, the image capturing device 100 may determine whether one or more visual patterns corresponding to a barcode appear in the image data 202. After the image capturing device 100 analyzes the image data 202 and/or the image metadata 204 based, at least in part, on the barcode OIT, the method 500 proceeds to block 506.

At block 506, the image capturing device 100 determines whether a representation of a barcode was identified in the image data 202. If the image capturing device 100 determines that a representation of a barcode was identified in the image data 202, the method 500 then proceeds to optional block 507 or block 508. If the image capturing device 100 determines that a representation of a barcode was not identified in the image data 202 and/or the image metadata 204, the method 500 then proceeds to block 514.

At block 507, the image capturing device 100 extracts data represented by the barcode. The data represented by the barcode can vary. For example, the barcode may represent a string of numbers corresponding to a universal product code, a series of alphanumeric characters, binary data, etc. After the image capturing device 100 extracts the data represented by the barcode, the method 500 proceeds to block 508.

At block 508, the image capturing device 100 sends a request for the object metadata 306 to the search and analysis system 140. The request may comprise an object characteristic, object, and/or object attribute associated with the barcode. For example, an object characteristic may be a particular value used by the search and analysis system 140 that corresponds to barcode-type objects. An object attribute may include the data represented by the barcode, such as a sequence of numbers. After the image capturing device 100 sends the request for the object metadata 306, the method 500 proceeds to block 510.

At block 510, the image capturing device 100 receives a response from the search and analysis system 140 comprising the object metadata 306 associated with the barcode. For example, if the object data associated with the barcode was a sequence of numbers representing a UPC, the object metadata 306 may include information associated with the corresponding product, such as product name, model number, manufacturer, price(s), etc. The object metadata 306 may also include search results similar to the search results that would have been returned if a user had entered an object characteristic, object data, or object attribute associated with the barcode into a search engine.

In some embodiments, the response from the search and analysis system 140 may be received asynchronously, as indicated by the dashed arrow between blocks 508 and 510. For example, the object identification module 136 may indicate that a particular function (e.g., a callback function) should be called when the image capturing device 100 receives the response from the search and analysis system 140. In some embodiments, the image capturing device 100 may explicitly determine that the response from the search and analysis system 140 has been received by, for example, polling another component or checking the value of a particular variable. After the image capturing device 100 receives the response comprising the object metadata 306 from the search and analysis system 140, the method 500 proceeds to block 512.

At block 512, the image capturing device 100 displays the object metadata 306 associated with the barcode. After the image capturing device 100 displays the object metadata 306 associated with the barcode, the method 500 ends.

If the image capturing device 100 determined, at block 506, that a representation of a barcode was not identified in the image data 202 and/or the image metadata 204, the method 500 proceeds to block 514. At block 514, the image capturing device 100 analyzes the image data 202 and/or the image metadata 204 based, at least in part, on a face OIT. For example, the image capturing device 100 may determine whether one or more visual patterns corresponding to a face appear in the image data 202. After the image capturing device 100 analyzes the image data 202 and/or the image metadata 204 based, at least in part, on the face OIT, the method 500 proceeds to block 516.

At block 516, the image capturing device 100 determines whether a representation of a face was identified in the image data 202. If the image capturing device 100 determines that a representation of a face was not identified in the image data 202, the method 500 proceeds to block 518 of FIG. 5B. If the image capturing device 100 determines that a representation of a face was identified in the image data 202, the method 500 ends.

Referring now to FIG. 5B, at block 518, the image capturing device 100 analyzes the image data 202 and/or the image metadata 204 based, at least in part, on an article OIT. The particular implementation of an article OIT can vary. For example, the article OIT may specify that if a focus distance, as specified in the image metadata 204, used by a camera associated with the image sensor 132 to capture the image data 202 is less than a particular threshold, the image data 202 includes characteristics of an article. As another example, the article OIT may specify that the image metadata 204 includes characteristics of an article if the image capturing device 100 is held at a specific orientation, as specified in the image metadata 204. After the image capturing device 100 analyzes the image data 202 and/or the image metadata 204 based, at least in part, on the article OIT, the method 500 proceeds to block 520.

At block 520, the image capturing device 100 determines whether article characteristics were identified in the image data 202 and/or the image metadata 204. If the image capturing device 100 determines that article characteristics were identified in the image data 202 and/or the image metadata 204, the method 500 proceeds to block 522. If the image capturing device 100 determines that article characteristics were not identified in the image data 202 and/or the image metadata 204, the method 500 proceeds to block 532.

At block 522, the image capturing device 100 indicates that an article may be represented in the image data 202. The particular indication can be similar to the indication described in relation to block 416 of FIG. 4. After the image capturing device 100 indicates that an article may be represented in the image data 202, the method 500 proceeds to block 524.

At block 524, the image capturing device 100 receives an indication that a remote object analysis (e.g., at an online search service, such as the search and analysis system 140) should be performed and that object metadata associated with any identified article should be retrieved. The indication may be similar to the indication received at block 418 of FIG. 4. After the image capturing device 100 receives the indication that the remote object analysis should be performed and that the object metadata associated with any identified article should be retrieved, the method 500 proceeds to block 526.

At block 526, the image capturing device 100 sends a search and analysis request 302 to the search and analysis system 140. The search and analysis request 302 may specify an object characteristic associated with an article, such as an object type corresponding to article-type objects. The search and analysis request 302 may also comprise the image data 202, image metadata 204, etc. After the image capturing device 100 sends the search and analysis request 302 to the search and analysis system 140, the method 500 proceeds to block 528.

At block 528, the image capturing device 100 receives, from the search and analysis system 140, a response comprising the object metadata 306 associated with an identified article. The object metadata 306 can include any data associated with an article identified in the image data 202 by the search and analysis system 140. The object metadata 306 may include a name of the article, search results associated with the article, etc.

In some embodiments, the response from the search and analysis system 140 may be received asynchronously, as indicated by the dashed arrow between blocks 526 and 528. For example, the object identification module 136 may indicate that a particular function (e.g., a callback function) should be called when the image capturing device 100 receives the response from the search and analysis system 140. In some embodiments, the image capturing device 100 may explicitly determine that the response from the search and analysis system 140 has been received by, for example, polling another component or checking the value of a particular variable. After the image capturing device 100 receives the response from the search and analysis system 140, the method 500 proceeds to block 530.

At block 530, the image capturing device 100 displays the object metadata 306 associated with the identified article. After the image capturing device 100 displays the object metadata 306 associated with the identified article, the method 500 ends.

If the image capturing device 100 determines, at block 520, that there are no article characteristics identified in the image data 202 and/or the image metadata 204, the method 500 proceeds to block 532. At block 532, the image capturing device 100 analyzes the image data 202 and/or the image metadata 204 based, at least in part, on a landmark OIT. The particular implementation of a landmark OIT can vary. For example, the landmark OIT may specify that if a focus distance, as specified in the image metadata 204, used by a camera associated with the image sensor 132 to capture the image data 202 is greater than a particular threshold, the image data 202 includes characteristics of a landmark. As another example, the landmark OIT may specify that a particular camera mode (e.g., panoramic mode) may be an object characteristic of a landmark. After the image capturing device 100 analyzes the image data 202 and/or the image metadata 204 based, at least in part, on the landmark OIT, the method 500 proceeds to block 534.

At block 534, the image capturing device 100 determines whether landmark characteristics were identified in the image data 202 and/or the image metadata 204. If landmark characteristics were identified in the image data 202 and/or the image metadata 204, the method 500 proceeds to block 536 of FIG. 5C. If landmark characteristics were not identified in the image data 202 and/or the image metadata 204, the method 500 ends.

Referring now to FIG. 5C, at block 536 the image capturing device 100 indicates that a landmark may be represented in the image data 202. The particular indication can be similar to the indication described in relation to block 416 of FIG. 4. After the image capturing device 100 indicates that a landmark may be represented in the image data 202, the method 500 proceeds to block 538.

At block 538, the image capturing device 100 receives an indication that a remote object analysis should be performed and that object metadata associated with any identified landmark should be retrieved. The indication may be similar to the indication received at block 418 of FIG. 4. After the image capturing device 100 receives the indication that the remote object analysis should be performed and that the object metadata associated with any identified landmark should be retrieved, the method 500 proceeds to block 540.

At block 540, the image capturing device 100 sends the search and analysis request 302 to the search and analysis system 140. The search and analysis request 302 may specify an object characteristic associated with a landmark, such as an object type corresponding to landmark-type objects. The search and analysis request 302 may also comprise the image data 202, the image metadata 204, etc. After the image capturing device 100 sends the search and analysis request 302 to the search and analysis system 140, the method 500 proceeds to block 542.

At block 542, the image capturing device 100 receives, from the search and analysis system 140, a response comprising the object metadata 306 associated with an identified landmark. The object metadata 306 can include any data associated with a landmark identified in the image data 202 by the search and analysis system 140. The object metadata 306 may include a name of the landmark, geocoordinates for the landmark, search results associated with the landmark, etc.

In some embodiments, the response from the search and analysis system 140 may be received asynchronously, as indicated by the dashed arrow between blocks 540 and 542. For example, the object identification module 136 may indicate that a particular function (e.g., a callback function) should be called when the image capturing device 100 receives the response from the search and analysis system 140. In some embodiments, the image capturing device 100 may explicitly determine that the response from the search and analysis system 140 has been received by, for example, polling another component or checking the value of a particular variable. After the image capturing device 100 receives the response from the search and analysis system 140, the method 500 proceeds to block 544.

At block 544, the image capturing device 100 displays the object metadata 306 associated with the identified landmark. After the image capturing device 100 displays the object metadata 306 associated with the identified landmark, the method 500 ends.

The method 500 depicts a particular implementation that illustrates at least three sequences of operations that may occur after the image capturing device 100 identifies an object characteristic, object, and/or object attribute. In particular, block 508 and block 510 depict the automatic retrieval of object metadata after identifying an object. In contrast, block 522 through block 528 depict the retrieval of object metadata after indicating that the object characteristic has been found and receiving an affirmative request to retrieve object metadata. Additionally, after the image capturing device 100 determines that a representation of a face was identified in the image data 202, the image capturing device 100 does not perform any additional operations associated with object metadata retrieval.

Figure 6A:
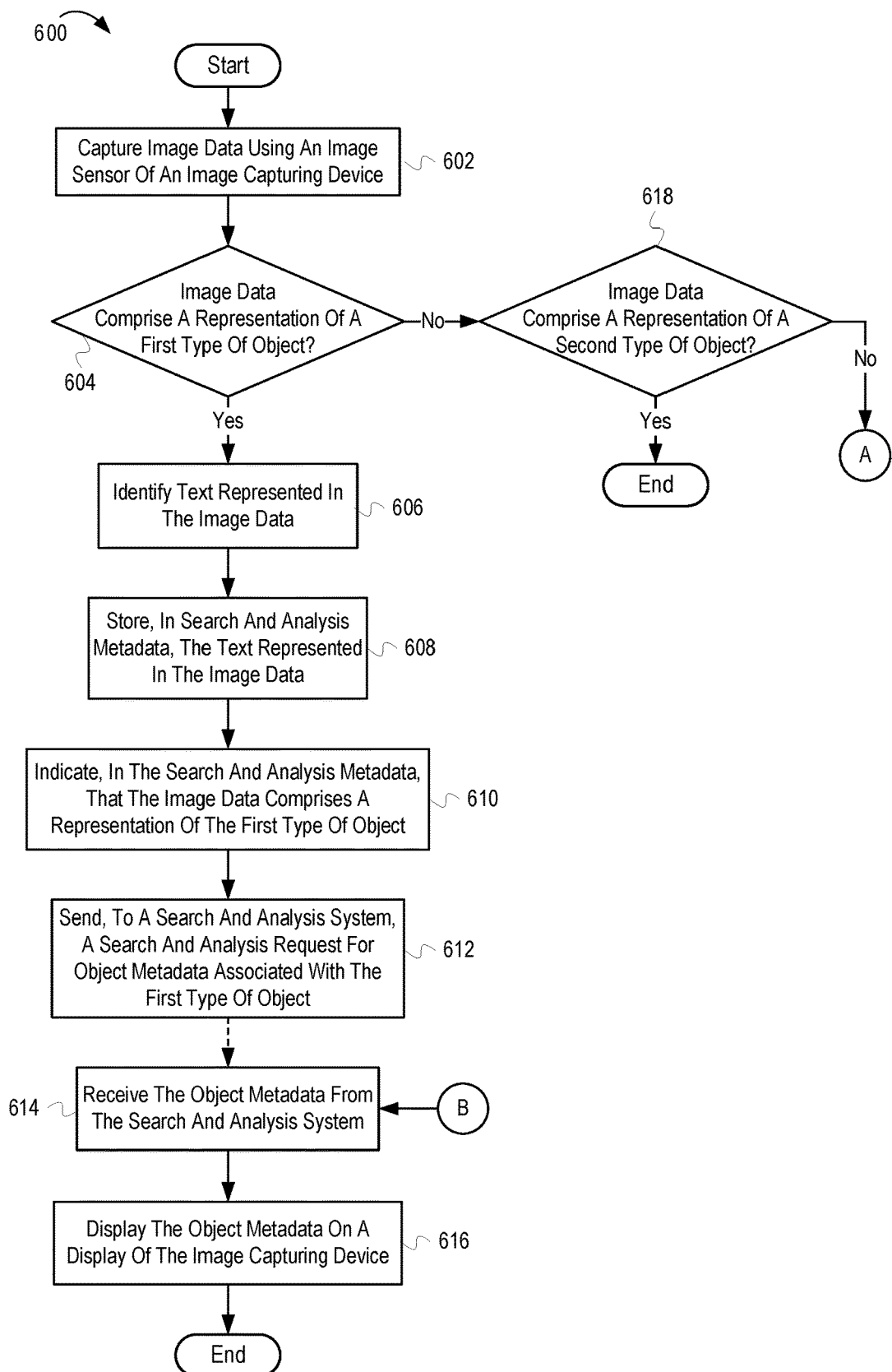
FIGS. 6A and 6B depict a method of using a search and analysis system to retrieve object metadata associated with an object represented in image data.
Figure 6B:
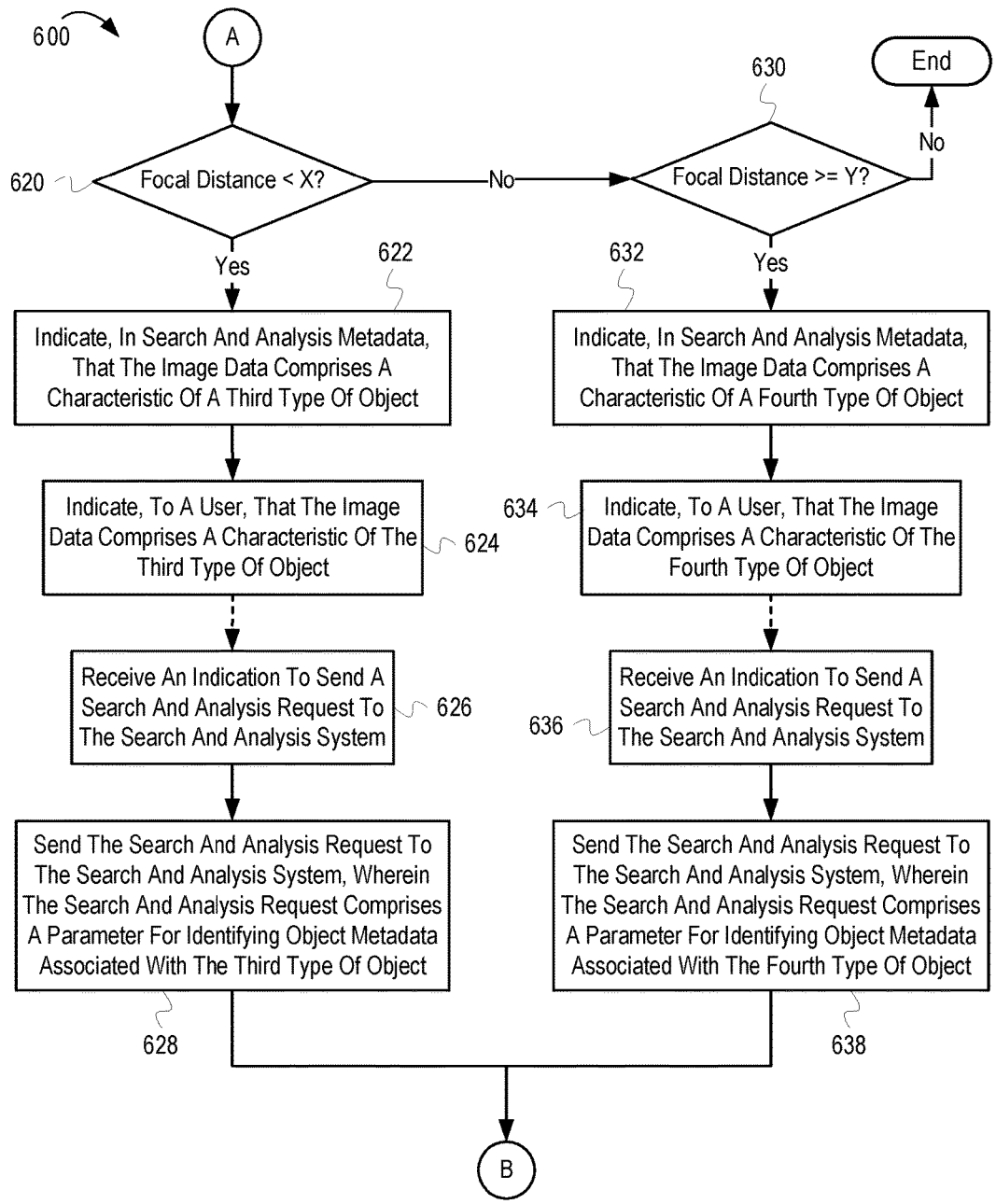

FIGS. 6A and 6B depict a method 600 of using a search and analysis system to retrieve object metadata associated with an object represented in image data. The method 600 may be performed by image capturing device 100 or any suitable component. For example, one or more of the processes of the method described in FIG. 6 may be performed by a processor (e.g., processor 102) executing program code associated with the object identification module 136 associated with an image capturing device (e.g., image capturing device 100).

Referring now to FIG. 6A, the method 600 begins at block 602. At block 602, the image capturing device 100 captures the image data 202 using the image sensor 132. At block 604, the image capturing device 100 determines whether the image data 202 comprises a representation of a first type of object. If the image data 202 comprises a representation of the first type of object, the method 600 proceeds to block 606. If the image data 202 does not comprise a representation of the first type of object, the method 600 proceeds to block 618.

At block 606, the image capturing device 100 identifies text represented in the image data 202. At block 608, the image capturing device 100 stores, in the image analysis metadata 222, the text represented in the image data 202. At block 610, the image capturing device 100 indicates, in the image analysis metadata 222, that the image data 202 comprises a representation of the first type of object. At block 612, the image capturing device 100 sends the search and analysis request 302 for the object metadata 306 associated with the first type of object to the search and analysis system 140. The transmission of the request may be automatically initiated or may be initiated by receipt of a trigger, such as a user action or application action. At block 614, the image capturing device 100 receives the object metadata 306 from the search and analysis system 140. At block 616, the image capturing device 100 displays the object metadata 306 on the display 130.

If the image capturing device 100 determines, at block 604, that the image data 202 does not comprise a representation of a first type of object, the method 600 proceeds to block 618. At block 618, the image capturing device 100 determines whether the image data 202 comprises a representation of a second type of object. If the image capturing device 100 determines that the image data 202 comprises a representation of the second type of object, the method 600 ends. If the image capturing device 100 determines that the image data 202 does not comprise a representation of the second type of object, the method 600 proceeds to block 620.

Referring now to FIG. 6B, at block 620, the image capturing device 100 determines whether a focus distance associated with the image data 202 is less that a first threshold (x). The specific value of the first threshold may vary between embodiments. For example, the first threshold may be a focus distance of one meter, two meters, or three meters depending on the implementation. If the image capturing device 100 determines that the focus distance is less than the first threshold, the method 600 proceeds to block 622. If the image capturing device 100 determines that the focus distance is not less than the first threshold, the method 600 proceeds to block 630.

At block 622, the image capturing device 100 indicates, in the image analysis metadata 222, that the image data 202 comprises a representation of a third type of object, based on the focus distance being less than the first threshold. At block 624, the image capturing device 100 indicates, to a user, that the image data 202 comprises a characteristic of the third type of object. At block 626, the image capturing device 100 receives an indication to send the search and analysis request 302 to the search and analysis system 140. At block 628, the image capturing device 100 sends the search and analysis request 302 to the search and analysis system 140. The search and analysis request 302 comprises a parameter for identifying the object metadata 306 associated with the third type of object. After sending the search and analysis request 302 to the search and analysis system 140, the method 600 proceeds to block 614.

If the image capturing device 100 determines, at block 620, that the focus distance associated with the image data 202 was not less than the first threshold (x), the method 600 proceeds to block 630. At block 630, the image capturing device 100 determines whether the focus distance is greater than or equal to a second threshold (y). In one or more embodiments, the second threshold may be the same as the first threshold. If the image capturing device 100 determines that the focus distance is greater than or equal to the second threshold, the method 600 proceeds to block 632. If the image capturing device 100 determines that the focus distance is not greater than or equal to the second threshold, the method 600 ends.

At block 632, the image capturing device 100 indicates, in the image analysis metadata 222, that the image data 202 comprises a characteristic of a fourth type of object. At block 634, the image capturing device 100 indicates, to a user, that the image data 202 comprises a characteristic of the fourth type of object. At block 636, the image capturing device 100 receives an indication to send the search and analysis request 302 to the search and analysis system 140. At block 638, the image capturing device 100 sends the search and analysis request 302 to the search and analysis system 140. The search and analysis request 302 comprises a parameter for identifying the object metadata 306 associated with the fourth type of object. After sending the search and analysis request 302 to the search and analysis system 140, the method 600 proceeds to block 614.

The particular implementations depicted by methods 500 and 600 are examples and should not be construed as limiting. Other implementations may include other OITs or perform different operations in response to determining that certain object types are represented in the image data 202. For example, method 500 depicts the object identification module 136 as performing one or more operations after determining that a barcode is represented in the image data 202. However, in some implementations the object identification module 136 may not perform additional operations after determining that a barcode is represented in the image data 202. As another example, method 500 depicts the object identification module 136 as performing no additional operations after determining that a face is represented in the image data 202. However, in some implementations the object identification module 136 may perform one or more operations after determining that a face is represented in the image data 202. For example, if the object identification module 136 determines that a face is represented in the image data 202, the object identification module 136 may display an actionable icon and, in response to a triggering event associated with the actionable icon, identify a person associated with the face in a local database and display contact information for the person.

In order to avoid obfuscating the examples above, a limited number of variations were described and some details left out. The discussion below describes additional variations and provides additional details regarding variations already described above.

The descriptions herein describe comparing numeric values. For example, at block 620 of FIG. 6B the image capturing device 100 determines whether a focus distance associated with the image data 202 is less than a first threshold. Similarly, at block 630 of FIG. 6B, the image capturing device 100 determines whether the focus distance associated with the image data 202 is greater than or equal a second threshold. The specific comparisons may vary between implementations. For example, in some implementations, the image capturing device 100 may determine whether the focus distance is less than or equal to the first threshold or determine whether the focus distance is greater than the second threshold.

Additionally, focal length can be used instead of focus distance. Focal length measures the distance between a camera lens and the image sensor 132. Focus distance is the distance between a particular point (e.g., the image sensor 132, camera lens, image capturing device 100, etc.) and the point in the distance that is in focus (or, in some instances, the closest or furthest point that is in focus). A particular focal length may correspond to a particular focus distance and vice versa, and the correspondence may vary between implementations based on factors such as the camera lens configuration, image sensor size, etc. Thus, focal length may be used in place of focus distance by using a focal length that corresponds to the desired focus distance. More generally, any measurement or value that is usable to determine the distance between the image capturing device 100 and an object that is represented in the image data 202 may be used. Thus, as used herein, the terms "focus distance" and "focal length" are interchangeable and can be further substituted with any measurement or value that can be used to determine the distance between the image capturing device 100 and an object that is represented in the image data 202.

As noted, the particular focus distances used as thresholds may vary between implementations. For example, an image capturing device 100 that includes a small, compact camera, such as a mobile device, may implement an incremental focus that focuses at distances of 7, 10, 14, 20, 30, 40, 50, 60, 120 centimeters, and "infinity". In such an implementation, the image capturing device 100 may use any of the incremental focus distances as a threshold (e.g., to determine whether an article or landmark may be represented in the image data 202). As another example, an image capturing device 100 that includes a lens capable of being manually focused may be capable of focusing continuously between 1.5 meters to infinity. Thus, the example focus distances described in this example are not to be limiting.

Although the object characteristics specified by the OITs are mostly described above in terms of identifying whether the image data 202 is indicative of a particular type of object, the object characteristics can be used to determine that the image data 202 does not contain a representation of a particular object. For example, a barcode OIT may specify that if a camera associated with the image sensor 132 is in a panoramic mode, additional analysis should be skipped and indicate that the image data 202 does not contain a representation of a barcode. Additionally, the various object characteristics and criteria used by the OITs may be combined.

As discussed above, the article OIT and landmark OIT may use various criteria to identify characteristics of articles and landmarks. Both may use focus distance to determine whether the image data 202 is indicative of an article or landmark. For example, the article OIT may determine that the image data 202 is indicative of an article if the focus distance specified in the image metadata 204 is less than a first threshold. Similarly, the landmark OIT may determine that the image data 202 is indicative of a landmark if the focus distance is greater than or equal to a second threshold (e.g., a focus distance of infinity). In some instances, the first threshold and the second threshold may be the same.

Both article and landmark OITs may use camera modes as criteria as well. For example, the article OIT may specify that an object is not represented in the image data 202 if a camera associated with the image sensor 132 is in a panoramic mode. Similarly, the landmark OIT may specify that the image data 202 may contain a landmark if a camera associated with the image sensor 132 is in panoramic mode. Similarly, the article and landmark OITs may use the orientation of the image capturing device 100 as criteria. For example, the article OIT may determine that the image data 202 may contain a representation of an article if the image sensor 132 is angled downward and the landmark OIT may determine that the image data 202 may contain a representation of a landmark if the image sensor 132 is angled upward. Inversely, the article OIT may determine that the image data 202 does not contain a representation of an article if the image sensor 132 is angled upward and the landmark OIT may determine that the image data 202 does not contain a representation of a landmark if the image sensor 132 is angled downward. Restrictions based on ranges may be applied. For example, the landmark OIT may determine that the image data 202 may contain a representation of a landmark if the image sensor 132 is angled upward within a particular range of angles (e.g., ten degrees and forty-five degrees).

Additionally, a landmark OIT may specify the use of local database 105 (e.g., stored on the image capturing device 100) to determine that the image data 202 may contain a landmark. For example, the local database may specify the geolocation of popular landmarks and determine that the image data 202 may contain a representation of a landmark based, at least in part, on the proximity of the image capturing device 100 to a landmark. Additionally, the image capturing device 100 may be able to determine whether the image capturing device 100 is oriented such that the image sensor 132 is facing a landmark based, at least in part, on the location of the image capturing device 100, the location of the landmark, and the orientation of the image capturing device 100, utilizing one or more sensors and/or geolocation module 107 (FIG. 1A).

OITs other than barcode OITs and face OITs may identify visual or geometric patterns characteristic of an object. For example, if the image sensor 132 captures image data of a nearby wall, the focus distance may be short enough to meet the criteria for an article, but no actual article is present. Similarly, if the image sensor 132 captures image data of a clear sky, the focus distance may be long enough to meet the criteria for a landmark, but no actual landmark is present. An OIT, however, may specify the use of techniques such as edge and depth detection to determine whether the image data 202 may contain a representation of an object. For example, if the image capturing device 100 does not detect any edges in the image data 202, the image data 202 may represent a flat surface that has a low probability of being identified as an object. Similarly, if the image capturing device 100 determines that there is only a single level of depth, the image capturing device 100 may determine that the image data 202 may represent a flat surface that has a low probability of being identified as an object. Similarly, color variances can be used as a characteristic similar to edge detection and levels of depth. For example, if the image data 202 contains a narrow range of colors, the image capturing device 100 may determine that there is a low probability that discernable representations of objects appearing in the image data 202.

The image metadata 204 may come from other components as well. For example, the image capturing device 100 may also have a depth sensor. The depth sensor may measure the distance between the image capturing device 100 and any surface towards which the depth sensor is oriented. In some implementations, the depth sensor may generate a depth map that captures multiple distance measurements between the image capturing device 202 and any surface(s) towards which the depth sensor is oriented. As noted above, the image capturing device 100 may use depth to detect, or assist in detecting, objects. Similarly, a light sensor (such as a light meter) may be used to determine specific light levels associated with the image data 202. For example, when capturing the image data 202, the image sensor 132 or the camera controller 134 may automatically adjust the brightness of the image data 202. However, a light sensor may provide a measurement of the actual brightness when the image data 202 was captured, thus providing a more accurate representation of the brightness than analyzing the image data 202 alone may provide. Data from sensors other than the image sensor 132 may be captured/generated continuously, periodically, or on-demand. For example, when or after the image data 202 is captured, the camera controller 134 or the processor 102 may request data from another sensor (e.g., a depth sensor) or retrieve previously captured data based, at least in part, on the time at which the image data 202 was captured.

The particular criteria used by an OIT to determine whether the image data 202 includes or may include a representation of a particular object can be dynamic. For example, the image metadata 204 and other data can be input into one or more machine-learning algorithms to determine more appropriate criteria. For example, consider a scenario in which the article OIT determines that image data 202 may contain a representation of an article if the focus distance is less than two meters. Each time the user requests that the image capturing device 100 identify an article and retrieve the corresponding object metadata 306, the image capturing device 100 passes the image metadata 204 to a machine-learning algorithm. After a period of time, the machine-learning algorithm determines that the user does not request that the image capturing device 100 identify an article and retrieve the corresponding object metadata 306 unless the focus distance is less than 1.5 meters. In response, the article OIT is updated to only display the article icon 216 when the focus distance is less than 1.5 meters.

Similarly, data from multiple image capturing devices can be aggregated and used as input into one or more machine-learning algorithms. For example, each time a user requests that an object be identified, the image capturing device 100 sends the image data 202 to the search and analysis system 140. The search and analysis system 140 can input the data received (including the image metadata 204, image analysis metadata 222, etc.) into the machine-learning algorithms, which can analyze the input data and adjust the OITs to more accurately determine when image data 202 may include a representation of an object.

In the examples described herein, the order in which the object identification module 136 uses the OITs to analyze the image data 202 is based, at least in part, on the amount of resources used by the OIT and/or the amount of time before the analysis is complete. For example, the time it takes to transfer the image data 202 to and receive a response from the search and analysis system 140 may be greater than using local resources (e.g., the processor 102 and the system memory 120) to identify objects represented in the image data 202. Thus, the object identification module 136 uses the local OITs 206 to analyze the image data 202 before using the remote OITs 208 to analyze the image data 202. The order in which the object identification module 136 uses the individual OITs within each class of OITs can be based on similar factors. Thus, in the examples described herein, the object identification module 136 uses the barcode identification module 206A to analyze the image data 202 before the face identification module 206B. Specific implementations can vary, however. For example, performing an analysis using a face OIT may, on average, take longer than an analysis using a remote OIT. In such an implementation, a remote OIT may be used before the face OIT.

As another example, the image capturing device 100 may utilize OITs in an order corresponding to the expected aggregate resource usage. For example, if, on average, a barcode OIT uses one-fifth of the resources used by a face OIT, but images are ten times more likely to include a face, the image capturing device 100 may perform an analysis with a face OIT before a barcode OIT.

In some instances, the object identification module 136 may analyze the image data 202 using multiple OITs in parallel. For example, the object identification module 136 may begin analysis using the barcode identification module 206A and the face identification module 206B at the same time, halting the analysis that is using the face identification module 206B if the barcode identification module 206A returns a result first.

In some implementations, OITs may specify operations to identify characteristics associated with different object types. For example, an OIT may specify that the image data 202 may have a representation of an article if the focus distance associated with the image data 202 is less than a particular threshold and that the image data 202 may have a representation of a landmark if the focus distance associated with the image data 202 is greater than the particular threshold. Similarly, some OITs may specify operations to identify multiple types of objects.

As utilized herein, the term barcodes is not limited to a linear barcode (e.g., a universal product code barcode), but includes two-dimensional (e.g., matrix-based) barcodes, three-dimensional barcodes (e.g., a matrix barcode that also uses colors), etc. Barcodes thus include QR codes and other similar concepts.

Although many locally identifiable objects could also be identified remotely, for the descriptions herein the term "remotely identifiable objects" excludes objects that are identified by the object identification module 136. In some instances, a particular object type may be locally identifiable but the object identification module 136 might not be able to identify the object itself. For example, although the object identification module 136 may determine that the image data 202 includes a representation of a business card, the text on the business card may be blurry, causing the object identification module 136 to be unable to identify the actual contact information on the business card. In such instances, the object identification module 136 may use the search and analysis system 140 to identify the object instead.

In the above-described methods of FIGS. 4, 5 (5A, 5B, and 5C), and 6 (6A and 6B), one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   capturing image data using an image sensor of a first device;
   determining, by the first device, whether the image data comprises a representation of a first type of object;
   in response to determining that the image data does not comprise a representation of the first type of object:
      determining that the image data comprises a characteristic of a different type of object based, at least in part, on a focus distance associated with the image data; and
      in response to determining that the image data comprises the characteristic of the different type of object, indicating, to a user, that the image data comprises a characteristic of the different type of object.

2. The method of claim 1, further comprising:
   in response to determining that the image data does not comprise a representation of the first type of object, determining, by the first device, whether the image data comprises a representation of a second type of object;
   wherein said determining that the image data comprises a characteristic of the different type of object is further in response to determining that the image data does no comprise a representation of the second type of object.

3. The method of claim 2, wherein said determining whether the image data comprises the representation of the first type of object comprises determining whether the image data comprises a representation of a barcode and wherein said determining whether the image data comprises the representation of the second type of object comprises determining whether the image data comprises a representation of a face.

4. The method of claim 1, wherein said determining that the image data comprises the characteristic of the different type of object comprises:
   determining that the focus distance is less than a threshold; and
   in response to said determining that the focus distance is less than the threshold, indicating, in image analysis metadata, that the image data comprises a representation of a third type of object.

5. The method of claim 1, wherein said determining that the image data comprises the characteristic of the different type of object further comprises:
   determining that the focus distance is greater than or equal to a threshold; and
   in response to determining that the focus distance is greater than or equal to the threshold, indicating, in image analysis metadata, that the image data comprises a representation of a fourth type of object.

6. The method of claim 1, further comprising:
   receiving an indication to send a search and analysis request to a second device; and
   in response to receiving the indication to send the search and analysis request to the second device, sending the image data and image analysis metadata to the second device, wherein the image analysis metadata comprises a parameter for identifying object metadata associated with the different type of object.

7. The method of claim 6, further comprising:
   receiving, from the second device, the object metadata; and
   displaying the object metadata on the display of the first device.

8. The method of claim 1, further comprising:
   in response to determining that the image data comprises the representation of the first type of object:
      identifying text represented in the image data; and
      in response to identifying that text is represented in the image data, storing, in image analysis metadata, the text represented in the image data.

9. A device comprising:
   an image sensor; and
   one or more processors that execute program code, wherein execution of the program code enables the device to:
      capture image data using the image sensor;
      for each of a first set of object types:
         determine whether a selected object type of the first set of object types is represented in the image data; and
         in response to a determination that the selected object type of the first set of object types is represented in the image data, indicate that the selected object type of the first set of object types is represented in the image data; and in response to a determination that no object type of the first set of object types is represented in the image data:

determine whether the image data comprises an object characteristic of a specific one of a second set of object types based, at least in part, on a first criterion; and in response to a determination that the image data comprises an object characteristic of the specific one of the second set of object types, indicate that the image data comprises an object characteristic of the specific one of the second set of object types.

10. The device of claim 9, wherein the device is further enabled to:

receive an indication that an object represented in the image data should be identified, wherein the type of the object is the specific one of the second set of object types;

in response to receiving an indication that an object represented in the image data should be identified, send the image data and image analysis metadata to a server, wherein the image analysis metadata provides an indication of the specific one of the second set of object types; and receive, from the server, object metadata associated with the image data, wherein the object metadata is based, at least in part, on the image analysis metadata.

11. The device of claim 9, wherein to determine whether the image data comprises an object characteristic of the specific one of the second set of object types the device:

determines whether a focus distance associated with the image data is less than a first value; and in response to a determination that the focus distance is less than the first value, indicates, in image analysis metadata, that the image data comprises an object characteristic of the specific one of the second set of object types.

12. The device of claim 11, wherein the device is further enabled to:

in response to a determination that the focus distance is not less than the first value:

determine that the focus distance is greater than or equal to a second value, wherein the second value is greater than or equal to the first value; and in response to a determination that the focus distance is greater than or equal to the second value, indicate, in the image analysis metadata, that the image data comprises an object characteristic of a different one of the second set of object types.

13. The device of claim 9, wherein said determination whether a selected object type of the first set of object types is represented in the image data is based, at least in part, on an object identification technique associated with the selected object type of the first set of object types.

14. The device of claim 13, wherein the object types of the first set of object types are iterated over in an order based, at least in part, on a criterion.

15. The device of claim 14, wherein the criterion comprises a performance metric associated with each object identification technique corresponding to each respective object type of the first set of object types.

16. The device of claim 9, wherein the device is further enabled to:

in response to a determination that no object type of the first set of object types is represented in the image data:

identify the object characteristic of the specific one of the second set of object types based, at least in part, on an edge detection technique or a depth detection technique.

17. A computer program product comprising:

a computer readable storage device with program code stored thereon which, when executed by one or more processors of a device, enables the device to:

capture image data using an image sensor of the device;

determine, by the device, whether the image data comprises a representation of a first type of object;

in response to a determination that the image data does not comprise a representation of the first type of object:

determine that the image data comprises a characteristic of a second type of object based, at least in part, on a focus distance associated with the image data; and in response to a determination that the image data comprises the characteristic of the second type of object, indicating that the image data comprises a characteristic of the second type of object.

18. The computer program product of claim 17, wherein the program code further comprises program code to:

receive an indication to send a search and analysis request to a search and analysis system;

in response to receiving the indication to send the search and analysis request to the search and analysis system, send the image data and image analysis metadata to the search and analysis system, wherein the image analysis metadata comprises a parameter for providing object metadata associated with the second type of object; and receiving, from the search and analysis system, the object metadata.

19. The computer program product of claim 17, wherein the program code which enables the device to capture image data using the image sensor of the device comprises program which enables the device to capture image data using the image sensor of the device in response to a determination that a setting associated with the device has remained within a particular range for a predetermined period of time.

* * * * *